US011086480B1

(12) United States Patent
Muraishi et al.

(10) Patent No.: US 11,086,480 B1
(45) Date of Patent: Aug. 10, 2021

(54) INFORMATION PROCESSING APPARATUS OF SETTING SCREEN AND NON-TRANSITORY COMPUTER READABLE MEDIUM STORING PROGRAM

(71) Applicant: FUJI XEROX CO., LTD., Tokyo (JP)

(72) Inventors: Rie Muraishi, Kanagawa (JP); Jun Hatano, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/929,120

(22) Filed: Jul. 15, 2020

(30) Foreign Application Priority Data

Mar. 24, 2020 (JP) .............................. JP2020-053321

(51) Int. Cl.
*G06F 3/0481* (2013.01)
(52) U.S. Cl.
CPC ................................ *G06F 3/04817* (2013.01)
(58) Field of Classification Search
CPC .................................................. G06F 3/04817
See application file for complete search history.

(56) References Cited

U.S. PATENT DOCUMENTS

| 8,363,233 B2 | 1/2013 | Yamada | |
| 2006/0171732 A1* | 8/2006 | Yamada | G03G 15/5087 399/81 |
| 2011/0219297 A1* | 9/2011 | Oda | G06F 40/166 715/246 |
| 2018/0136810 A1* | 5/2018 | Martin | G06F 3/1256 |

FOREIGN PATENT DOCUMENTS

| JP | 2007310468 | 11/2007 |
| JP | 4510652 | 7/2010 |

* cited by examiner

*Primary Examiner* — Roland J Casillas
(74) *Attorney, Agent, or Firm* — JCIPRNET

(57) ABSTRACT

An information processing apparatus includes: a processor configured to store plural screens satisfying a predetermined condition among screens used for setting a device accompanying a series of screen transitions, in association with one icon; and display the plural screens associated with the icon in order and receive the setting of the device from each screen of the plural screens in a case where a user selects the icon.

15 Claims, 24 Drawing Sheets

FIG. 15
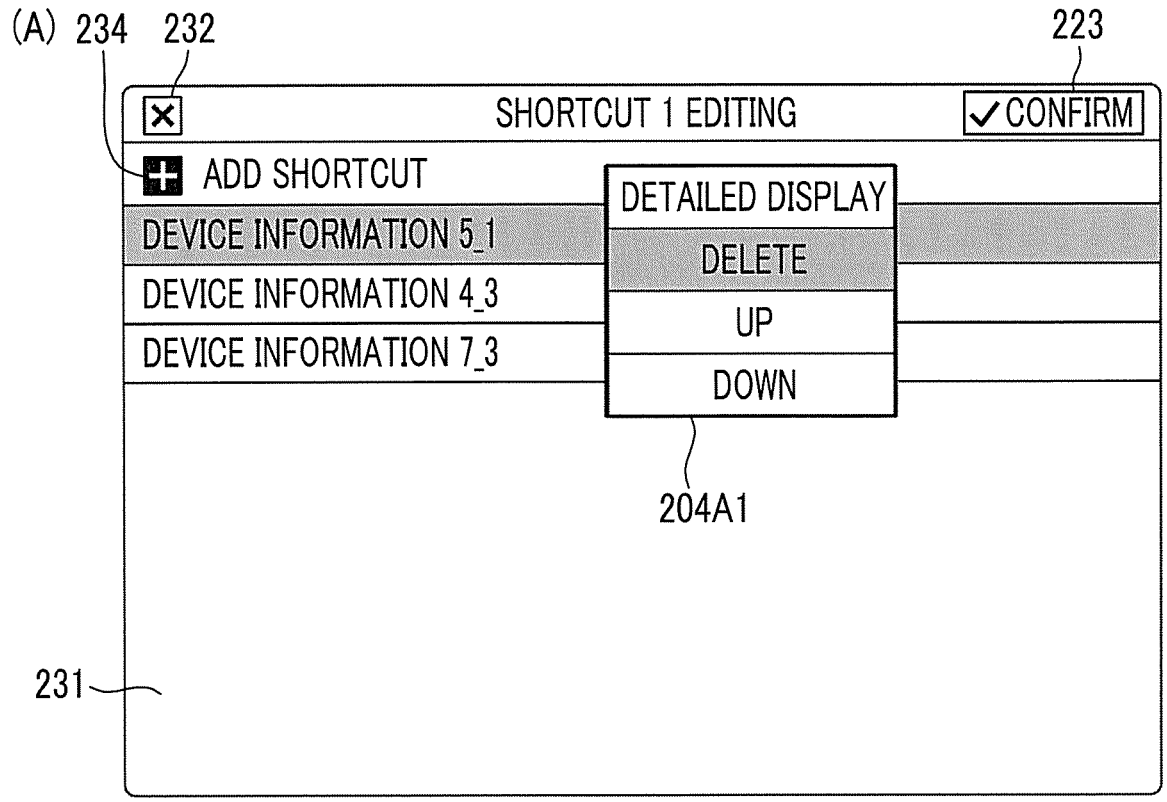
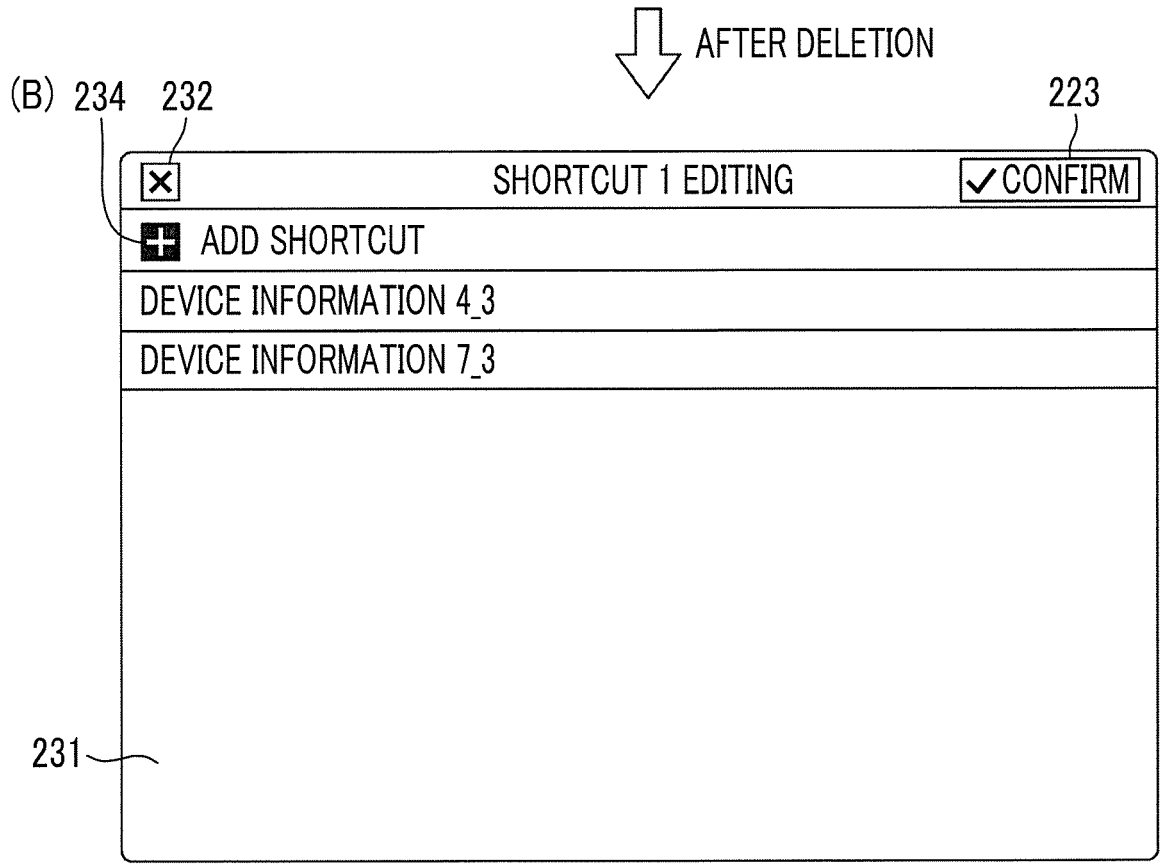

FIG. 17
(A)
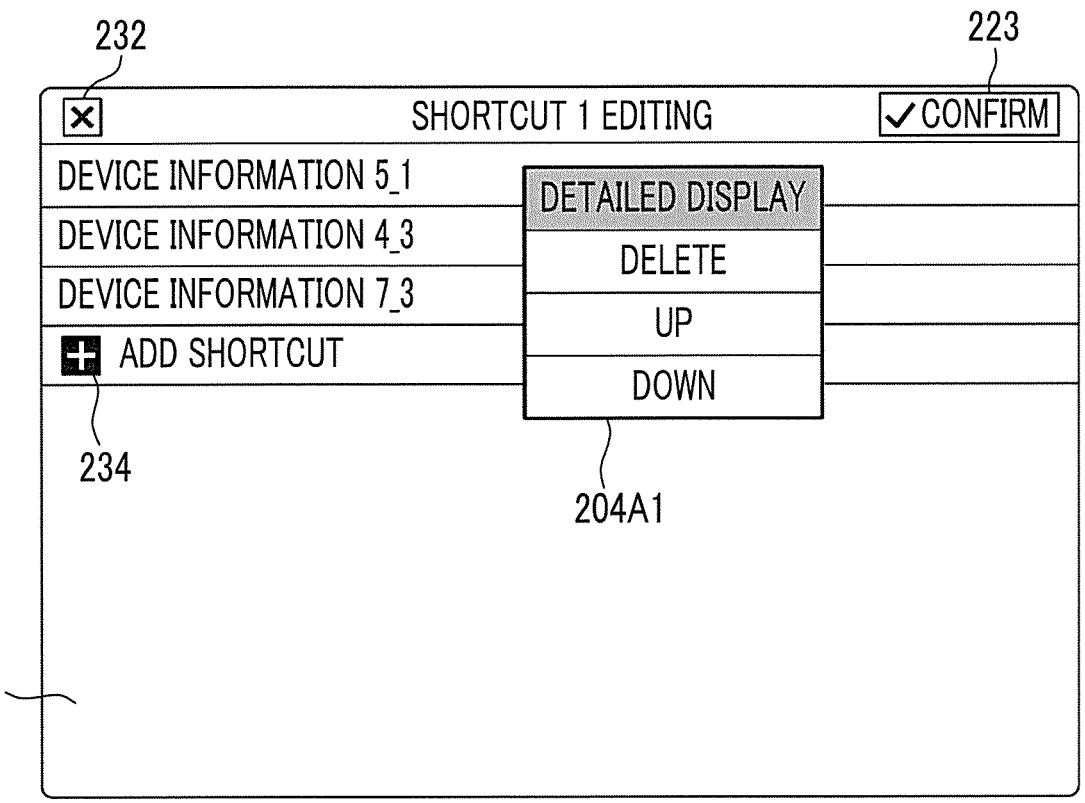
(B)
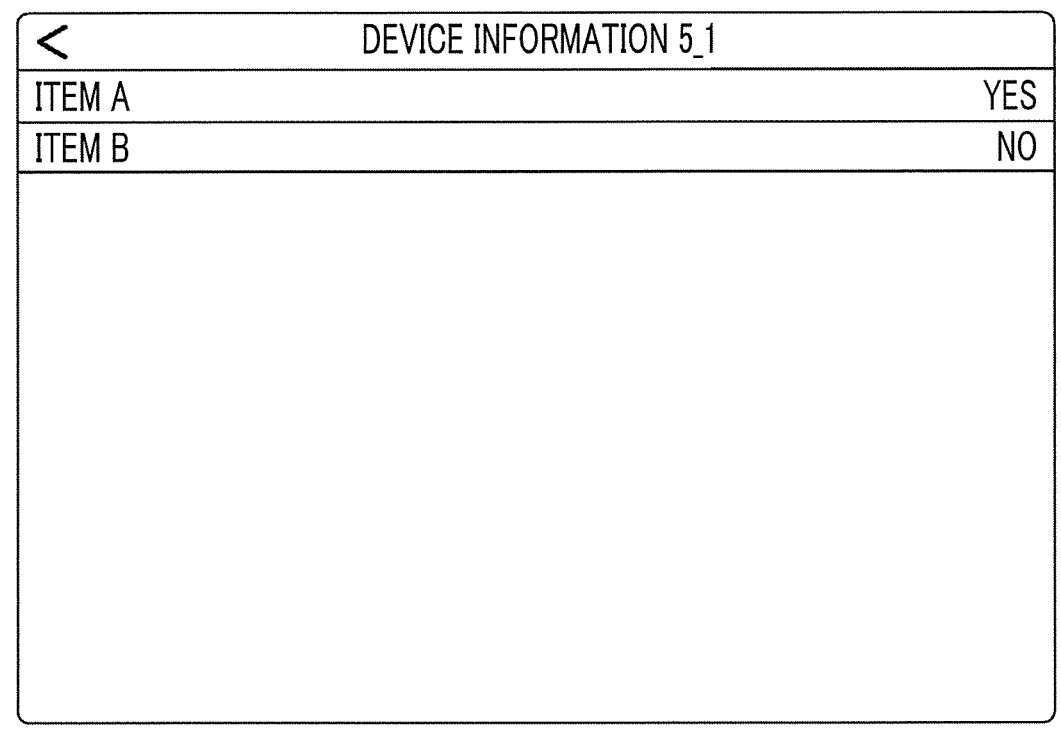

FIG. 18
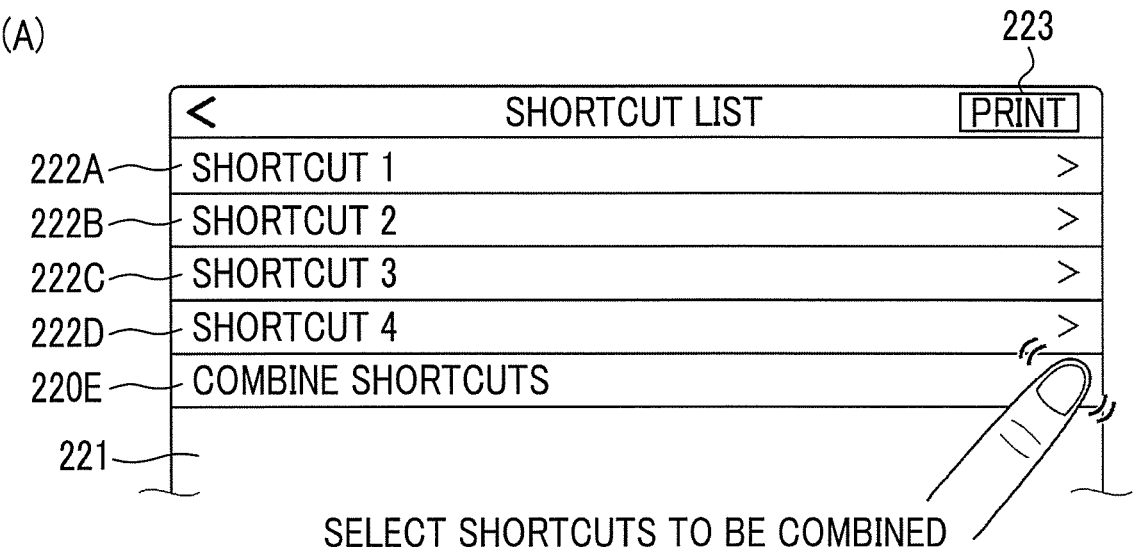
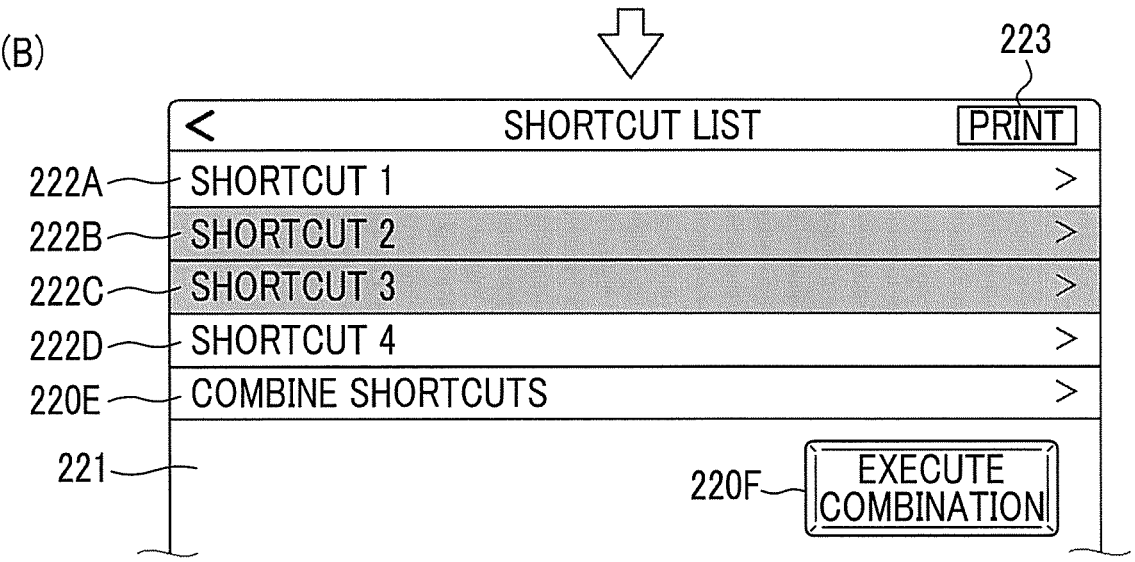
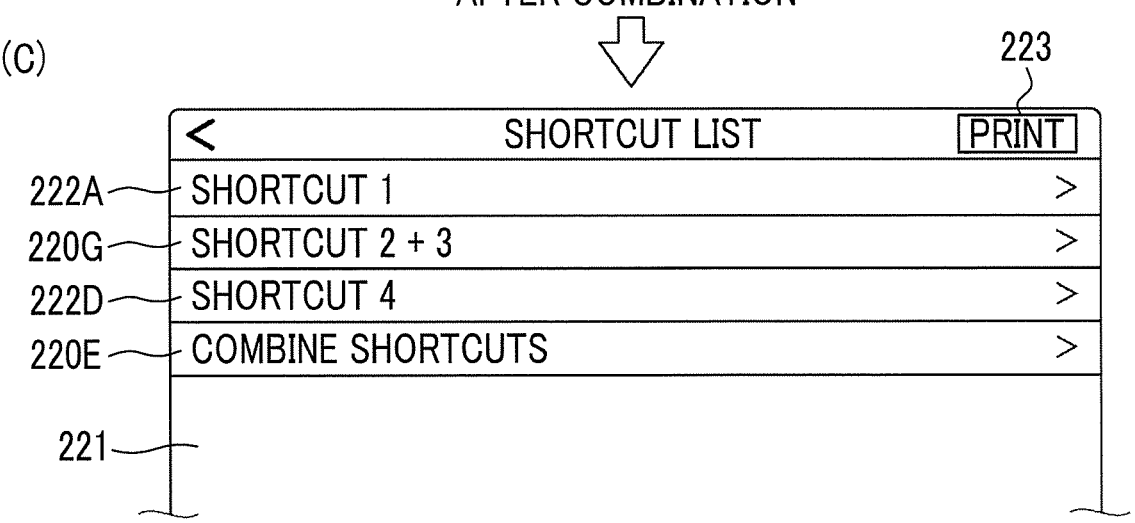

INFORMATION PROCESSING APPARATUS OF SETTING SCREEN AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-053321 filed Mar. 24, 2020.

BACKGROUND

(i) Technical Field

The present invention relates to an information processing apparatus and a non-transitory computer readable medium storing a program.

(ii) Related Art

A device in the present day has a screen which allows a user to change a setting. However, it takes time and effort for the user to switch between screens every time the setting is performed. In addition, in a case where there is no section to check a procedure, there is a possibility that settings of some items are omitted.

Therefore, there is a technology of recording a series of screen transitions including the screen used for setting a device in association with one button. For example, JP2007-310468A describes a technology of previously designating whether or not to display all setting screens which appear during screen transitions when a user performs a setting operation.

SUMMARY

In a case where all the series of screen transitions are recorded in association with one button, an order of displayed setting screens is fixed to an order of transitions, and the order of display cannot be changed. Further, it is not possible to add a display of a setting screen which does not appear in the series of screen transitions afterward. In this case, there is a possibility that a setting on the setting screen appearing in a procedure different from the recorded series of procedures is omitted.

It is possible to record each setting screen corresponding to one icon, but in that case, there is a possibility that the setting is omitted due to a large number of icons.

Aspects of non-limiting embodiments of the present disclosure relate to an information processing apparatus and a non-transitory computer readable medium storing a program that can perform a setting without omission, as compared with a case where a series of screen transitions are recorded and a setting screen designated in advance is displayed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a processor configured to store a plurality of screens satisfying a predetermined condition among screens used for setting a device accompanying a series of screen transitions, in association with one icon; and display the plurality of screens associated with the icon in order and receive the setting of the device from each screen of the plurality of screens in a case where a user selects the icon.

BRIEF DESCRIPTION OF THE DRAWINGS

Exemplary embodiment(s) of the present invention will be described in detail based on the following figures, wherein:

FIG. 15 is a diagram illustrating an example of deleting a setting screen associated with "shortcut 1", a part (A) in FIG. 15 is a diagram illustrating a mode in which a top line is deleted, and a part (B) in FIG. 15 is a diagram illustrating a display after the deletion;

FIG. 17 is a diagram illustrating a mode in which contents of a setting screen of a corresponding line are displayed on an editing screen by operating a check button, a part (A) in FIG. 17 is a diagram illustrating a mode in which a check button of a line of "device information 5_1" is operated, and a part (B) in FIG. 17 is a diagram illustrating a display of an editing screen after the operation;

FIG. 18 is a diagram illustrating a mode of receiving a combination of registered shortcuts on a screen on which a list of shortcuts is displayed, a part (A) in FIG. 18 illustrates an operation of a button for instructing the combination of the shortcuts, a part (B) in FIG. 18 illustrates a state in which two shortcuts to be combined are selected, and a part (C) in FIG. 18 illustrates a display after execution of the combination;

DETAILED DESCRIPTION

Hereinafter, exemplary embodiments of the present invention will be described with reference to drawings.

Exemplary Embodiment

Appearance Configuration

Figure 1:
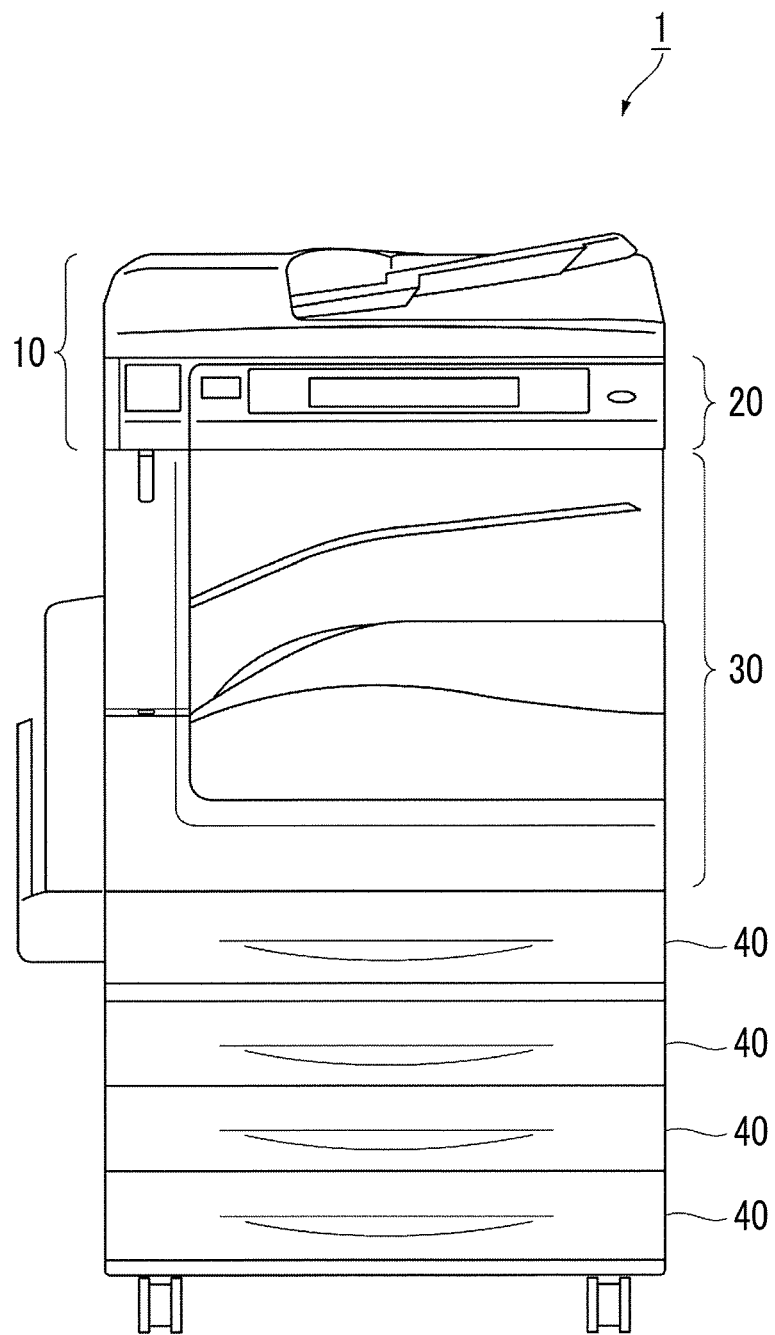
FIG. 1 is a diagram illustrating an example of an external structure of an image forming apparatus used in an exemplary embodiment.

FIG. 1 is a diagram illustrating an example of an external structure of an image forming apparatus 1 used in the exemplary embodiment.

The image forming apparatus 1 illustrated in FIG. 1 includes an image reading apparatus 10, an operation panel 20, an apparatus main body 30, and a paper feeding tray 40.

The image reading apparatus 10 is an apparatus which optically reads a document and outputs read information as image data. The image reading apparatus 10 illustrated in FIG. 1 is compatible with both a reading method in which a document is placed on a reading surface and a reading head is relatively moved, and a reading method in which the reading head is fixed and the document is relatively moved. Hereinafter, the image reading apparatus 10 is also referred to as a scanner.

The operation panel 20 has a button used for operation, a lamp used for notification of a state, and a touch panel display. The operation panel 20 is attached to a front side of the image reading apparatus 10. The operation panel 20 is used for providing information to a user and receiving an instruction from the user. Hereinafter, the operation panel 20 is also referred to as a user interface (UI).

The apparatus main body 30 has a data processing unit which processes data and a printing unit. The data processing unit is an example of an information processing apparatus. The printing unit is a printer which prints an image on paper.

In addition, the apparatus main body 30 also has a paper feed mechanism which transports paper from the paper feeding tray 40 to the printing unit, and a discharge mechanism which discharges the printed paper. The printing unit according to the present exemplary embodiment employs a printing method using toner as a recording material. Meanwhile, a printing method using ink as a recording material may be adopted.

The image forming apparatus 1 according to the present exemplary embodiment is an example of an image processing apparatus.

Configuration of Data Processing Unit

Figure 2:
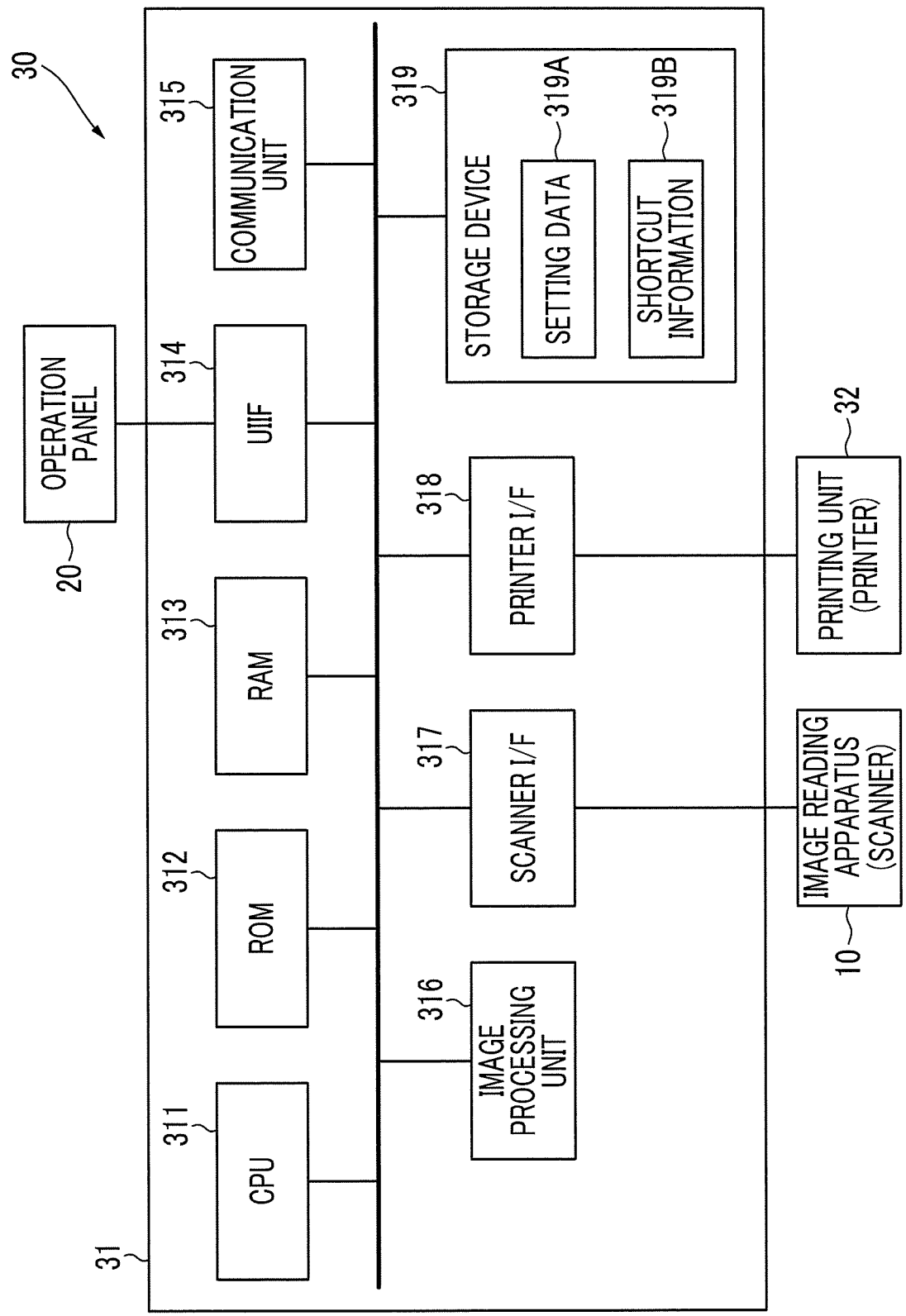
FIG. 2 is a diagram illustrating a configuration example of an apparatus main body.

FIG. 2 is a diagram illustrating a configuration example of the apparatus main body 30. The apparatus main body 30 has a data processing unit 31 and a printing unit 32. The printing unit 32 is an apparatus which prints an image corresponding to print data on paper. The printing unit 32 is an example of an image forming apparatus.

The data processing unit 31 includes a central processing unit (CPU) 311, a read only memory (ROM) 312 which stores a basic input output system (BIOS), and the like, and a random access memory (RAM) 313 used as a work area. A so-called computer is configured with the CPU 311, the ROM 312, and the RAM 313.

In addition, the data processing unit 31 includes a UIIF 314 which relays data communication with the operation panel 20, a communication unit 315 which realizes communication with an external apparatus, an image processing unit 316 which executes various data processes on image data, a scanner IF 317 which relays data communication with the image reading apparatus 10, a printer IF 318 which relays data communication with the printing unit 32, and a storage device 319 which stores an application program (hereinafter, referred to as "program"), data set by a user, or the like.

The communication unit 315 is a functional block having a Local Area Network (LAN) port, a port of transmitting and receiving a facsimile document, and the like.

The image processing unit 316 is a functional block which applies a data process such as tone conversion or color correction to image data.

The storage device 319 is a non-volatile storage medium and is used to store various types of data including programs and image data. The storage device 319 is configured with, for example, a hard disk device or a non-volatile semiconductor memory. In a case of FIG. 2, setting data 319A and shortcut information 319B are illustrated as an example of various types of data.

The setting data 319A is data related to a setting which defines an operation of a device constituting the image forming apparatus 1. The setting data 319A includes, for example, a setting related to a program, a setting related to a network, a setting related to a system, a setting related to checking consumables, and a setting related to checking a meter.

The setting related to the program include a setting related to the printing unit, a setting related to the image reading apparatus 10, a setting related to saving an image read by the image reading apparatus 10 in the storage device 319, a setting related to mail transmission, a setting related to transmission and reception of a facsimile document, and a setting related to Internet fax.

These settings are input through an operation of the user on an operation screen. Hereinafter, the operation screen used for inputting the settings will be referred to as a "setting screen".

The shortcut information 319B is information used for calling a specific function or a screen previously set by the user. An icon displayed on the touch panel is used to call a function associated with the shortcut information 319B or call a screen. A setting screen associated with the icon is stored in the storage device 319 as the shortcut information 319B.

Operation of User on Shortcut Registration

In the image forming apparatus 1 used in the present exemplary embodiment, a function of registering one or a plurality of frequently used setting screens with one name and directly calling the setting screen registered as a shortcut by an operation of a corresponding icon is prepared. This function is also called a job memory. The plurality of setting screens to be called are registered in the shortcut. The shortcut is also called a group shortcut in terms of a set including the plurality of setting screens as elements.

Figure 3:
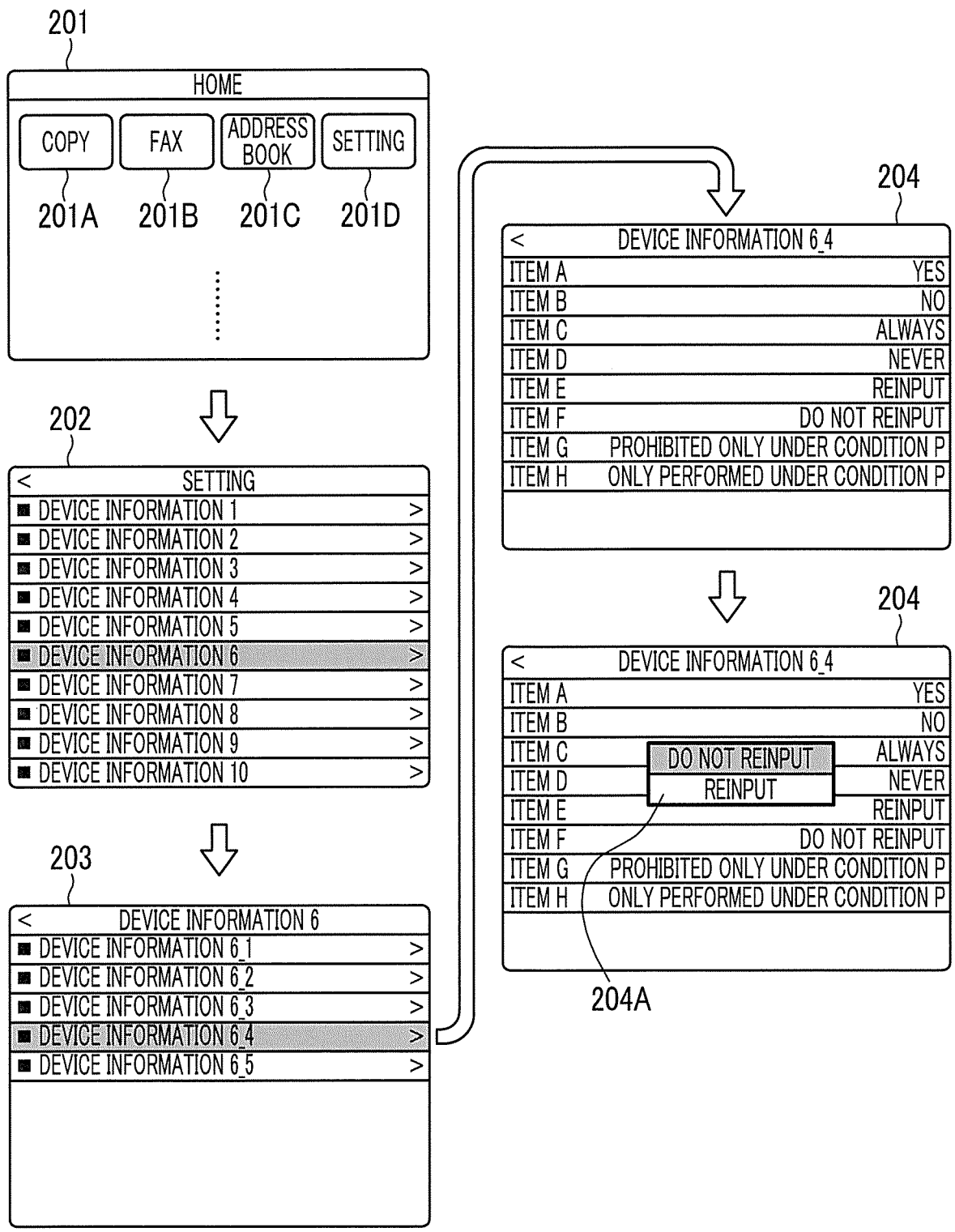
FIG. 3 is a diagram illustrating a part of an operation accompanying registration of a shortcut.

FIG. 3 is a diagram illustrating a part of an operation accompanying registration of a shortcut. In a case of the present exemplary embodiment, one icon is assigned to one shortcut, and execution of the shortcut is started by operating the corresponding icon. Therefore, in the following description, the icon corresponding to the shortcut may be treated as the shortcut.

An operation accompanying registration is started by displaying a home screen 201. On the home screen 201 illustrated in FIG. 3, an icon 201A which calls an operation screen related to copying, an icon 201B which calls an operation screen related to fax, an icon 201C which calls an address book, an icon 201D which calls an operation screen related to setting, and the like are displayed.

The home screen 201 illustrated in FIG. 3 illustrates a state in which the icon 201D is selected. In a case where the icon 201D is selected, a screen (not illustrated) for selecting a function to be set is displayed on the touch panel. In the present exemplary embodiment, a shortcut registration button is selected on the screen.

A screen 202 is a screen first displayed after selecting the shortcut registration button.

The screen 202 displays a list of names of device information to be set. In a case of FIG. 3, the screen 202 displays a list of ten names. Here, the name includes, for example, "system setting", "application program setting", "network setting", "consumable checking", and "meter checking".

In a case where a rightward symbol of ">" disposed at the right end of each name is tapped, the corresponding name is in a selected state. In FIG. 3, "device information 6" is selected. In a case where a leftward symbol of "<" in the upper left corner on the screen 202 is tapped, the display on the touch panel returns to the previous home screen 201.

The screen 203 is a screen displayed in a case where "device information 6" is selected.

On the screen 203, a list of sub-information assigned to "device information 6" is displayed. In a case of FIG. 3, the screen 203 displays a list of five pieces of sub-information. A name of the sub-information here depends on the name of the higher-level device information. In FIG. 3, "device information 6_4" is selected. Also in a case of the screen 203, in a case where a symbol of "<" in the upper left corner is tapped, the screen 203 is returned to the previous screen 202.

A screen 204 is a screen displayed in a case where "device information 6_4" is selected. The screen 204 is an example of a screen used for setting a device.

On the screen 204, a list of eight items and the current settings for each item is displayed.

The eight items are items assigned to the selected sub-information.

In a case of FIG. 3, a setting of an item A is "yes", a setting of an item B is "no", a setting of an item C is "always", a setting of an item D is "never", a setting of an item E is "reinput", a setting of an item F is "do not reinput", a setting of an item G is "prohibited only under condition P", and a setting of an item H is "only performed under condition P". Contents of the setting for each item differ depending on the corresponding item.

The setting content of each item is a state in which an operation of the shortcut registration button is received.

In a case where a specific item is tapped on the screen 204, a small screen 204A including options related to the corresponding item is displayed in a pop-up format. In a case of FIG. 3, the item F is tapped. In the case of FIG. 3, on the small screen 204A, two of "do not reinput" and "reinput" are displayed as options. The option illustrated on the small screen 204A is an example of items displayed in a selectable manner. Since the current setting state is "do not reinput", the corresponding option is displayed in a selected state. In a case where one of the options on the small screen 204A is tapped, a setting is received.

The number of options displayed on the screen varies depending on types of items, and is not limited to two and may be three or more.

Ina case where there are a plurality of contents of which settings are to be changed on the screen 204, a user sequentially designates selection of the items and a change of the settings.

After that, the user operates a leftward symbol of "<" in the upper left corner to return to the previous screen 203. In a case where the user wants to check a setting state of other device information included in the screen 203 or in a case where the user wants to change the setting of the other device information, the user selects a line of specific device information on the screen 203.

In a case where an operation of setting the device information included in the screen 203 is completed, the user operates a leftward symbol of "<" in the upper left corner to return to the previous screen 202.

On the screen 202 as well, in a case where the user wants to check a setting state of other device information or in a case where the user wants to change the setting of the other device information, the user selects a line of specific device information on the screen 202. In a case where the leftward symbol of "<" in the upper left corner is operated, the screen 202 is returned to the previous home screen 201.

In a case of JP2007-310468A described above, all of the series of screen transitions are recorded in association with one icon. In other words, the screen 202, the screen 203, and the screen 204 are all recorded in association with one icon. The icon here is also called a shortcut key.

On the other hand, in the method proposed in the present exemplary embodiment, only the screen 204 instructed by the user is recorded in association with one icon. In other words, in the case of the present exemplary embodiment, a screen transition up to the screen 204 is not recorded in association with the icon.

Figure 4:
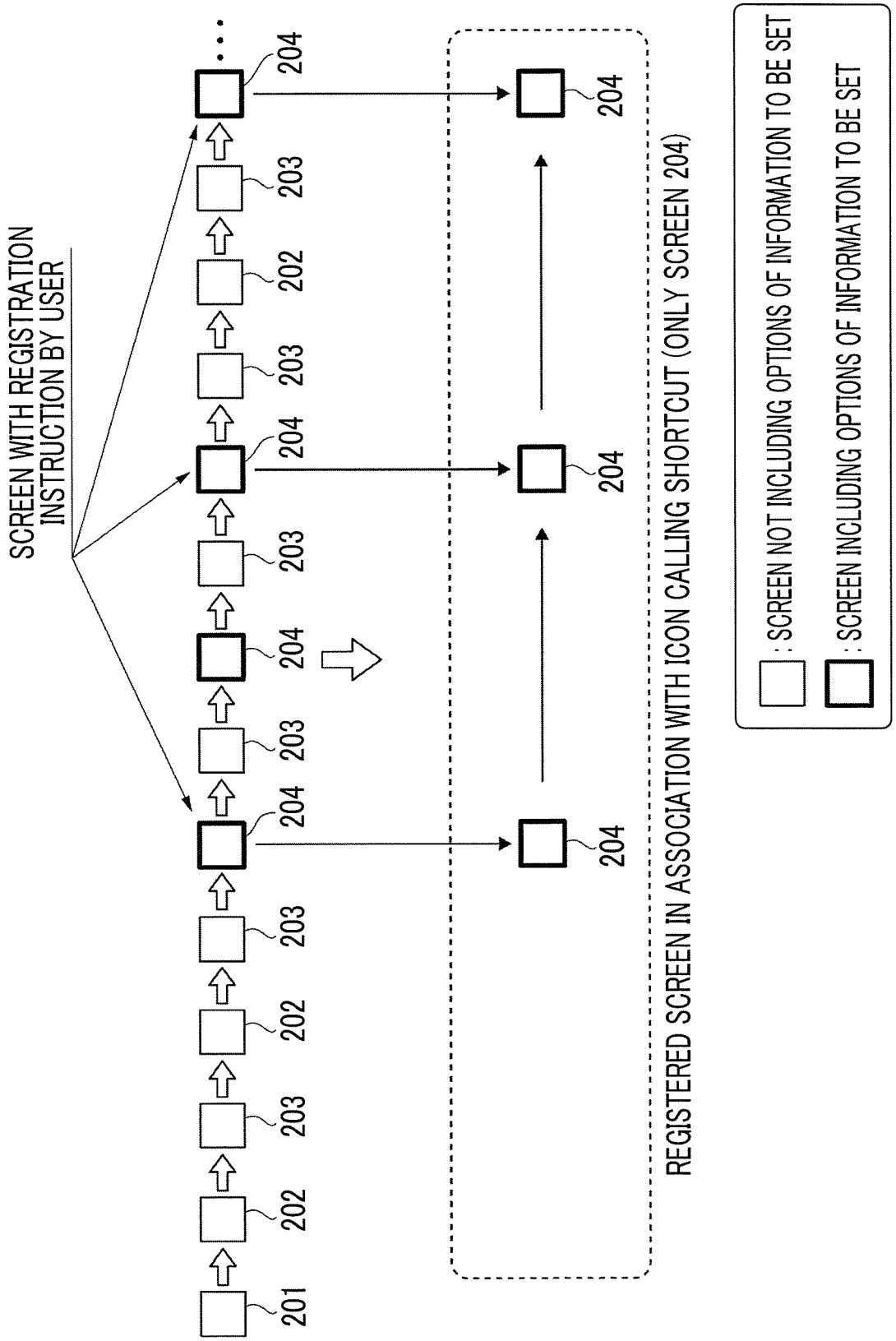
FIG. 4 is a diagram illustrating a relationship between a screen transition accompanying a setting of a shortcut and a screen associated with an icon registered as the shortcut according to the exemplary embodiment.

FIG. 4 is a diagram illustrating a relationship between a screen transition accompanying a setting of a shortcut and a screen associated with an icon registered as the shortcut according to the exemplary embodiment.

The square frames illustrated in the upper line represent individual screens sequentially displayed on the touch panel as a new shortcut is registered. The screen indicated by a thin frame line indicates a screen not including options for information to be set. The screen here corresponds to the screen 202 or the screen 203.

On the other hand, the screen indicated by a thick frame line indicates a screen including the options of information to be set. The screen here corresponds to the screen 204.

As illustrated in the area surrounded by the broken line, in the case of the present exemplary embodiment, only the screen 204 is registered in association with an icon for calling a shortcut. In the case of the present exemplary embodiment, information on an order in which the screen 204 appears at the time of registration is stored. As will be described below, an array of screens 204 can be edited.

As illustrated in FIG. 4, in the case of the present exemplary embodiment, not all the screens 204 displayed on the touch panel after the registration of the shortcut is started are registered in association with one icon. For example, in a case of FIG. 4, the screen 204 which second appears is not associated with the icon for calling the shortcut. The reason is that the user did not instruct to register the screen 204 in the shortcut. This is because it is not necessary to call the screen 204 opened by mistake from the icon. Meanwhile, all the screens 204 may be registered in association with the icon used for calling the shortcut.

Processing Operation

Hereinafter, among processing operations executed by the image forming apparatus 1 according to the present exemplary embodiment, each operation related to shortcut registration, shortcut editing, and shortcut calling will be described in order.

Shortcut Registration

Hereinafter, a processing operation related to registration of a shortcut will be described with reference to FIGS. 5 to 9.

Figure 5:
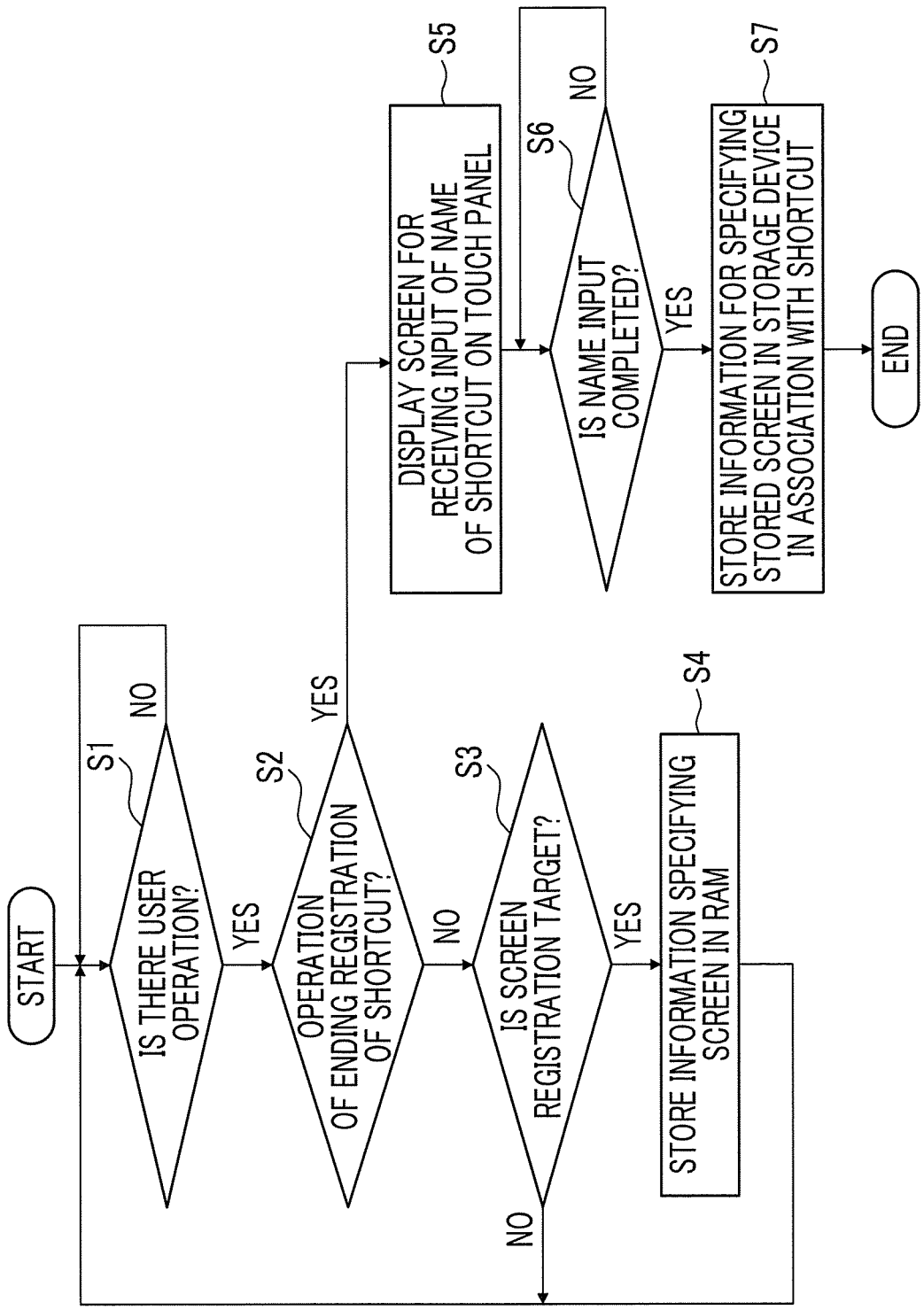
FIG. 5 is a flowchart illustrating an example of a processing operation executed in a case where a shortcut is registered.

FIG. 5 is a flowchart illustrating an example of a processing operation executed in a case where a shortcut is registered. The symbol S illustrated in FIG. 5 means a step.

This flowchart starts in a case where the CPU 311 (see FIG. 2) receives an instruction to register a shortcut of a setting screen.

Figure 6:
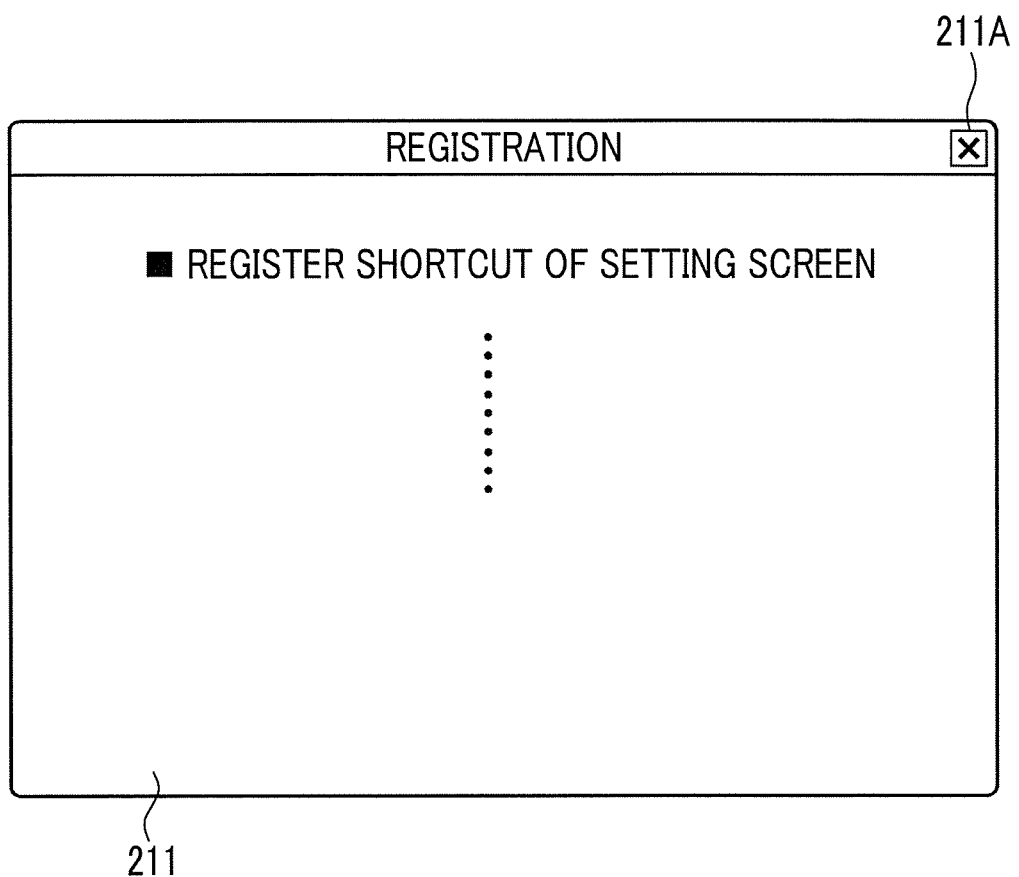
FIG. 6 is a diagram illustrating an example of a registration reception screen.

FIG. 6 is a diagram illustrating an example of a registration reception screen 211. On the registration reception screen 211, a list of receivable targets is displayed. In FIG. 6, only options corresponding to the registration of the shortcut of the setting screen are displayed, and a display of other options is omitted.

The flowchart illustrated in FIG. 5 described above is started in a case where the user selects "register shortcut of setting screen" on the registration reception screen 211. In a case where the button 211A displayed in the upper right corner of the registration reception screen 211 is operated by the user, the home screen 201 is displayed again.

Returning to the description in FIG. 5. In the case of the present exemplary embodiment, in a case where the shortcut registration operation is started, the CPU 311 determines whether or not there is a user operation (step S1). The operation here is, for example, switching of screens and designation of information to be set as described with reference to FIG. 3.

In a case where a negative result is obtained in step S1, the CPU 311 repeats the determination in step S1.

In a case where a positive result is obtained in step S1, the CPU 311 determines whether or not the user operation is an operation of ending the registration of the shortcut (step S2). The CPU 311 executes the determination in step S2 depending on whether or not the user operation is a registration end button (not illustrated).

Here, a case where a negative result is obtained in step S2 is considered. In a case where a negative result is obtained in step S2, the case is that a content of the user operation is other than an operation of the registration end button.

In this case, the CPU 311 determines whether or not the screen on which the user operation is detected is a registration target (step S3).

In a case where a positive result is obtained in step S3, there is a case where an explicit instruction of the user does not exist but a predetermined condition is satisfied, or a case where the explicit instruction of the user exists.

For example, in a case where the screen 204 (see FIG. 3) including options of information to be set is designated as a screen satisfying the predetermined condition, a positive result is obtained in step S3 even in a case where there is no explicit instruction from the user.

Figure 7:
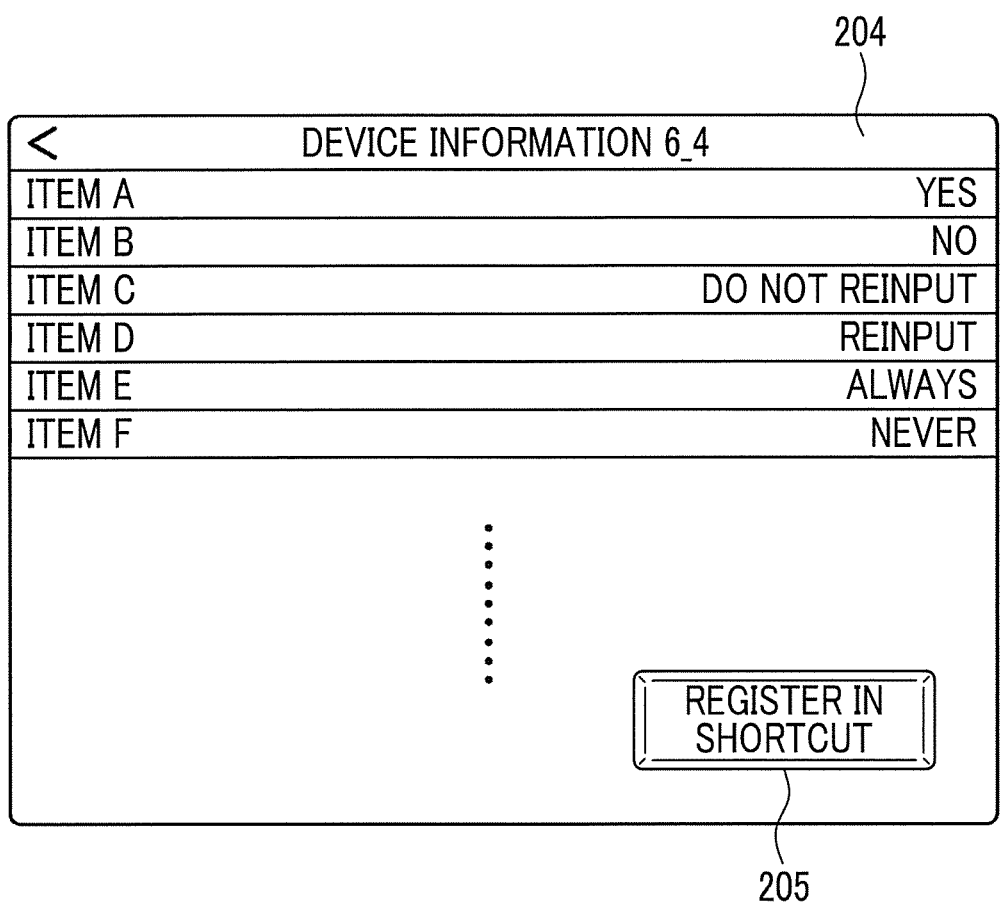
FIG. 7 is a diagram illustrating a case where a button used to instruct registration of a shortcut is displayed on a screen.
Figure 8:
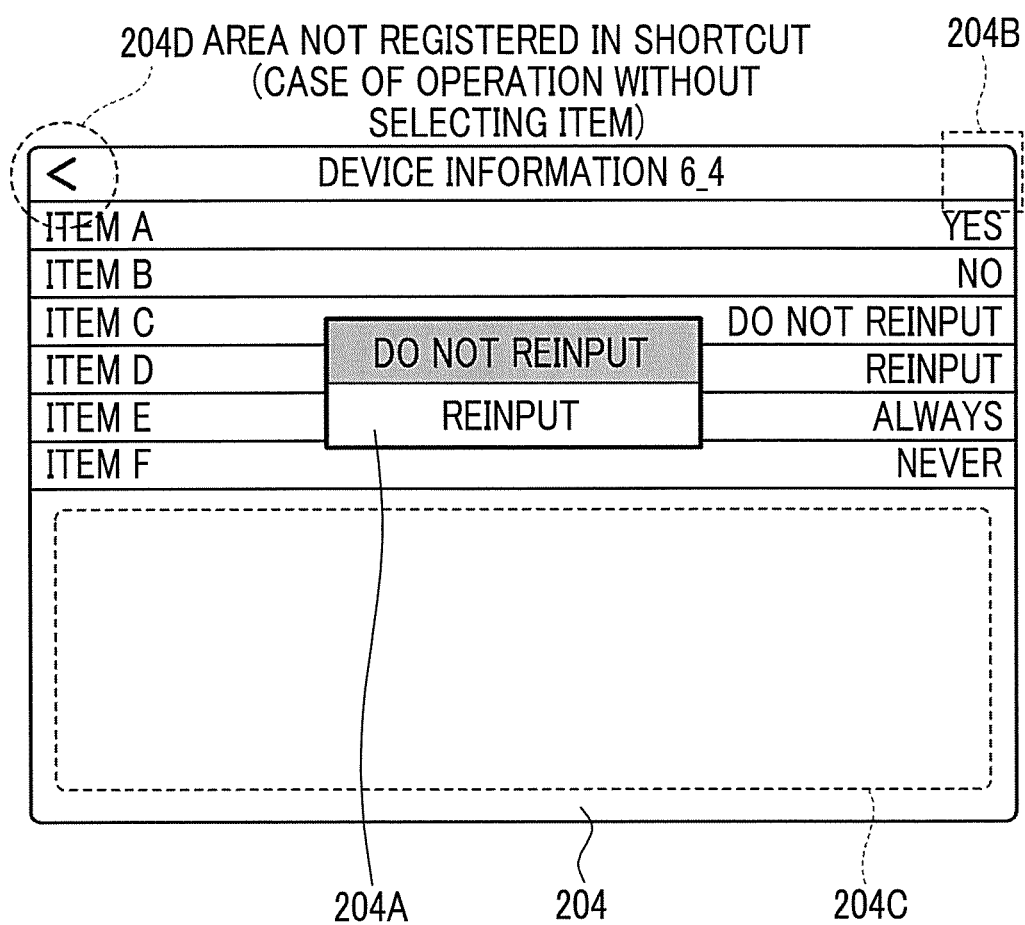
FIG. 8 is a diagram illustrating a case where a specific operation of a user is received as an instruction for registration in a shortcut.

On the other hand, in a case where the user explicitly instructs a screen to be registered, an operation on a specific area on the screen may be detected as illustrated in FIG. 7 or 8.

FIG. 7 is a diagram illustrating a case where a button 205 used to instruct registration of a shortcut is displayed on the screen 209.

The screen 204 illustrated in FIG. 7 represents a setting screen for "device information 6_4". In a case of FIG. 7, the button 205 labeled "register as shortcut" is displayed in the lower right corner on the screen 204. In a case where an operation of the button 205 is detected since the screen 204 is displayed until the screen 204 transitions to another screen, the CPU 311 obtains a positive result in step S3. In other words, in a case where the operation of the button 205 is not detected, the CPU 311 obtains a negative result in step S3.

In FIG. 7, "register as shortcut" is used as the label of the button 205, but as long as the label is an expression which can be understood that the screen 204 being displayed is registered to a shortcut by the operation of the button 205, the description content and the display form of the button are not limited.

FIG. 8 is a diagram illustrating a case where a specific operation of a user is received as an instruction for registration in a shortcut.

In a case of the screen 204 illustrated in FIG. 8, tapping of the user on an area 204B surrounded by the broken line in the upper right corner is received as an instruction to register the shortcut of the screen 204 being displayed. In a case of FIG. 8, although the area 204B is blank, the area 204B has the same function as the button 205 (see FIG. 7).

Further, on the screen 204 illustrated in FIG. 8, an operation of the user on the small screen 204A is regarded as a registration instruction in a shortcut. This is because the operation of the user on the small screen 204A means selection of an option, and there is a high need for display even in the settings after the next time. In a case where the operation of the user on these areas is detected, a positive result is obtained in step S3.

In the case of FIG. 8, it is assumed that the options are displayed on the small screen 204A, but in a case of the screen 204 on which only options related to a specific item are displayed, an operation for the options is regarded as a registration instruction in the shortcut. In this case, there is an example of a setting screen of "device information 7_3" in FIG. 22.

In the case of the present exemplary embodiment, long-pressing of the area 204B is regarded as operation of a registration end button. Unlike the tapping, the long pressing means that a state in which the user's finger touches is detected for a predetermined threshold value or more.

In the case of the present exemplary embodiment, an operation except for the operation for selecting an option and the operation for the area 204B is irrelevant to the instruction for the shortcut registration.

In the case of FIG. 8, an area for actively instructing not to be used for registration in the shortcut is prepared. In other words, FIG. 8 provides an area for excluding the screen being displayed, from the shortcut target.

For example, the area 204C in which the item to be set is not displayed is used to receive an instruction not to register the screen 204 being displayed as the shortcut. In a case where the area 2040 is operated after detecting the operation of registration in the shortcut, the CPU 311 can also determine that the registration in the shortcut is canceled. In a case where the registration instruction is canceled, information specifying the screen 204 is deleted from the RAM 313 (see FIG. 2).

Further, in a case where a symbol 204D at the upper left corner on the screen 204 is operated without selecting an item in the screen 204, the CPU 311 considers that the screen 204 is opened by mistake, and determines that the shortcut registration is canceled. In this case, the screen 204 is valid also in a case where the screen 204 is regarded as unconditionally registered as the shortcut. Of course, in a case where the symbol 204D is operated, the screen 204 moves to the previous screen 203.

Incidentally, in a case where the operation of the symbol 204D is detected after an operation of selecting an option, the CPU 311 receives the screen 204 as an operation for returning to the previous screen 203, and does not regard the screen 204 as cancellation of registration in the shortcut. This is because this operation is an operation for moving the screen.

In a case where a positive result is obtained in step S3, the CPU 311 stores information specifying the screen 204 in the RAM 313 (see FIG. 2) (step S4). After that, the CPU 311 returns to the process in step S1.

On the other hand, in a case where a negative result is obtained in step S3, the CPU 311 returns to step S1 without executing step S4.

The above determination is repeated until a positive result is obtained in step S2. As illustrated in FIG. 5, only the screen 204 which obtains the positive result in step S3 is stored in the RAM 313, and the screen 202 or the screen 203 displayed until the screen 204 is displayed is not stored.

In a case where a positive result is obtained in step S2, the CPU 311 displays a screen for receiving an input of a name of a shortcut used for calling the shortcut, on the touch panel (step S5).

After that, the CPU 311 determines whether or not the input of the name is completed (step S6). The CPU 311 repeats the determination in step S6 while a negative result is obtained in step S6.

In a case where a positive result is obtained in step S6, the CPU 311 stores the stored information for specifying the screen 204 in the storage device 319 (see FIG. 2) in association with the shortcut (step S7). A new icon with the name received in step S5 is also stored in the storage device 319.

In the present exemplary embodiment, being associated with a shortcut is also expressed as being associated with an icon used for calling the shortcut.

Figure 9:
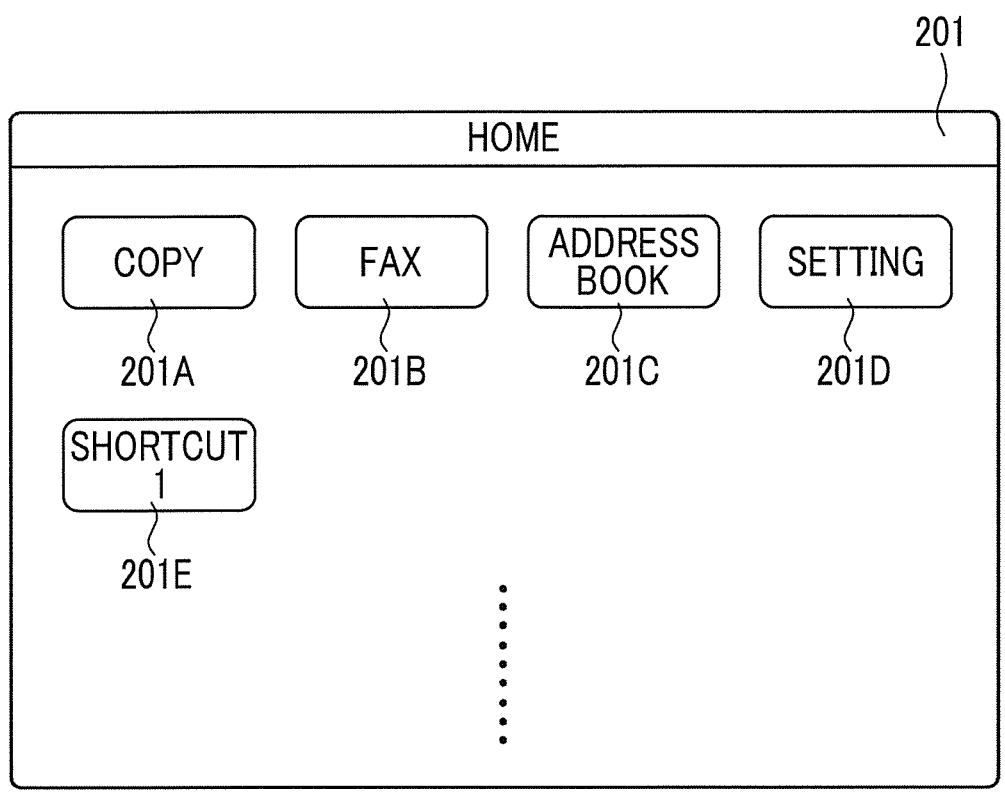
FIG. 9 is a diagram illustrating a display example of a home screen after registration of a shortcut.

FIG. 9 is a diagram illustrating a display example of the home screen 201 after registration of a shortcut. In FIG. 9, the portions corresponding to those in FIG. 3 are illustrated with the corresponding reference numerals.

An icon 201E labeled as "shortcut 1" is added to the home screen 201 illustrated in FIG. 9.

In a case where the user operates this icon 201E, a setting screen associated with the icon 201E, that is, the screen 204, is sequentially displayed on the touch panel.

In the case of the present exemplary embodiment, as described with reference to FIG. 4, only the screen 204 used for setting is associated with the icon 201E, and a screen (hereinafter, also referred to as "transition screen") displayed in the process of transition to the screen 204 is not associated with the icon 201E.

In other words, a relationship between the icon 201E and the screen 204 in the present exemplary embodiment is determined regardless of the transition screen until the screen 204 is displayed. Therefore, the degree of freedom in editing the order in which the screens 204 associated with the icon 201E are displayed and a combination of the screens 204 associated with the icon 201E is increased.

Shortcut Editing

Hereinafter, the processing operation related to the editing of the shortcut will be described with reference to FIGS. 10 to 19.

Figure 10:
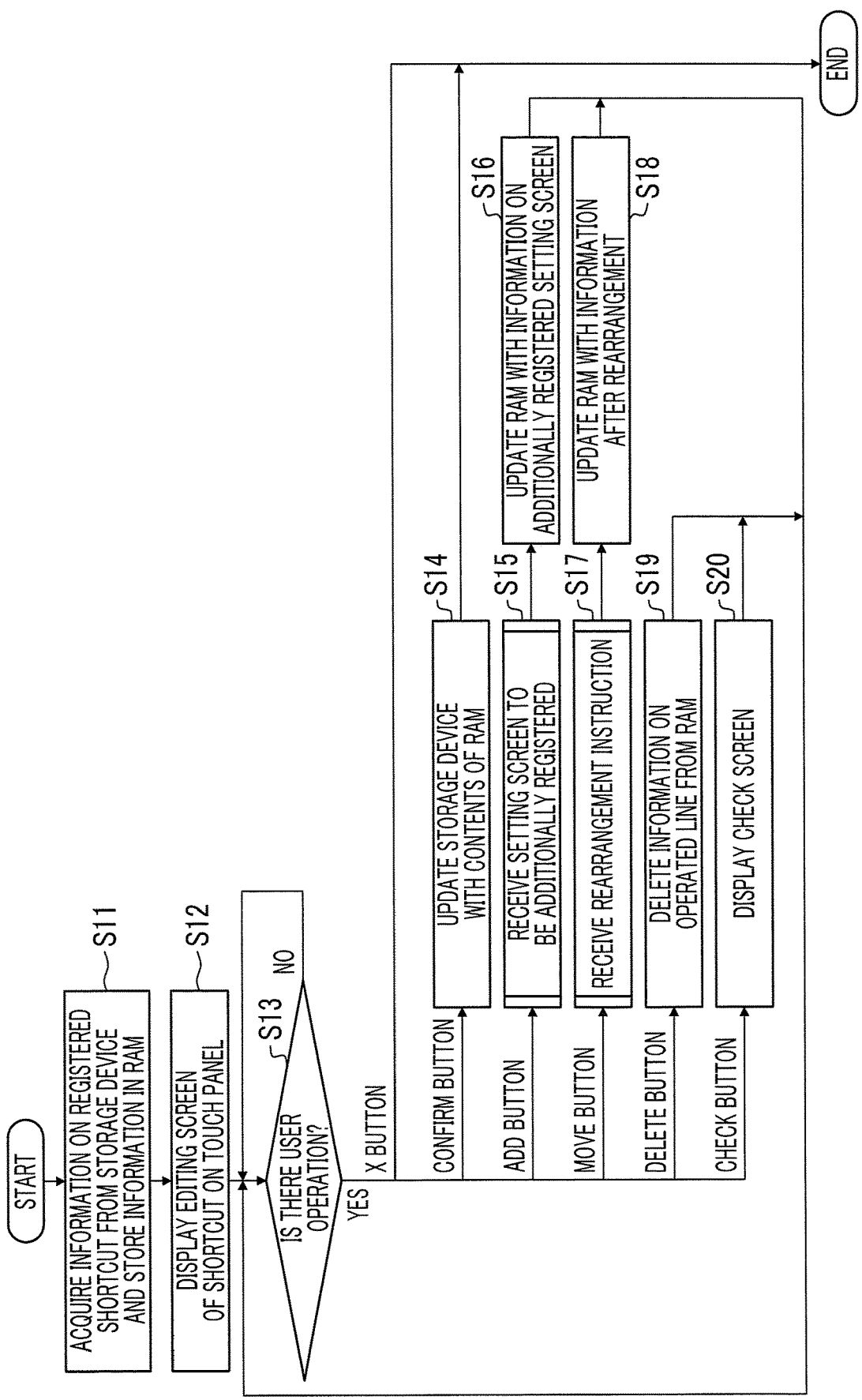
FIG. 10 is a flowchart illustrating an example of a processing operation executed in a case where information on a shortcut is edited.

FIG. 10 is a flowchart illustrating an example of a processing operation executed in a case where information on a shortcut is edited. The symbol S illustrated in FIG. 10 means a step.

This flowchart starts in a case where the CPU 311 (see FIG. 2) receives an instruction to edit a shortcut.

First, the CPU 311 acquires information on the registered shortcut from the storage device 319 (see FIG. 2) and stores the information in the RAM 313 (see FIG. 2) (step S11).

Figure 11:
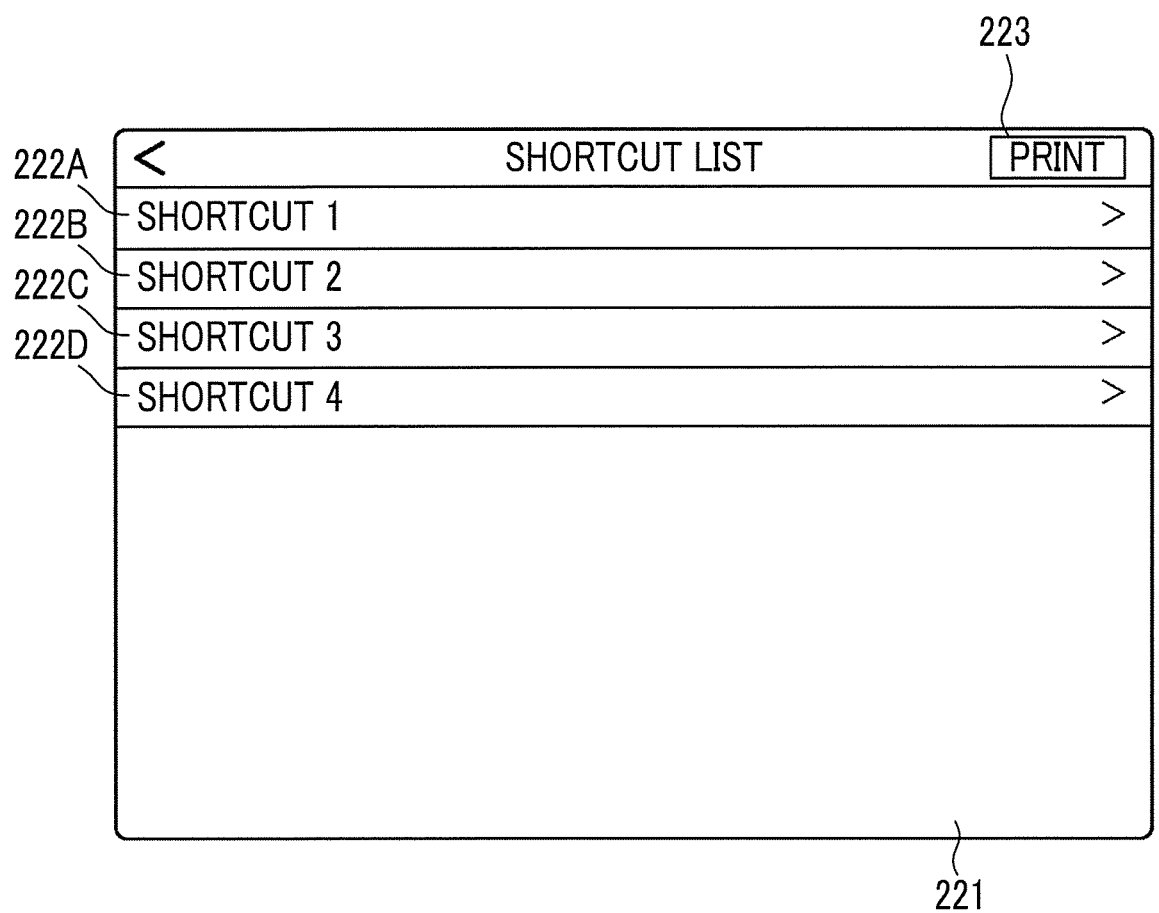
FIG. 11 is a diagram illustrating an example of a screen on which a list of registered shortcuts is displayed.

FIG. 11 is a diagram illustrating an example of a screen 221 on which a list of registered shortcuts is displayed. On the screen 221, four shortcuts are displayed in a list. Names 222A to 222D are attached to the respective shortcuts. In a case where any one of the four is selected by the user, the CPU 311 displays an editing screen of the selected shortcut on the touch panel (step S12).

A button 223 labeled "print" is arranged in the upper right corner in the screen 221. The button 223 is used to output a report of all shortcut procedures displayed on the screen 221.

Figure 12:
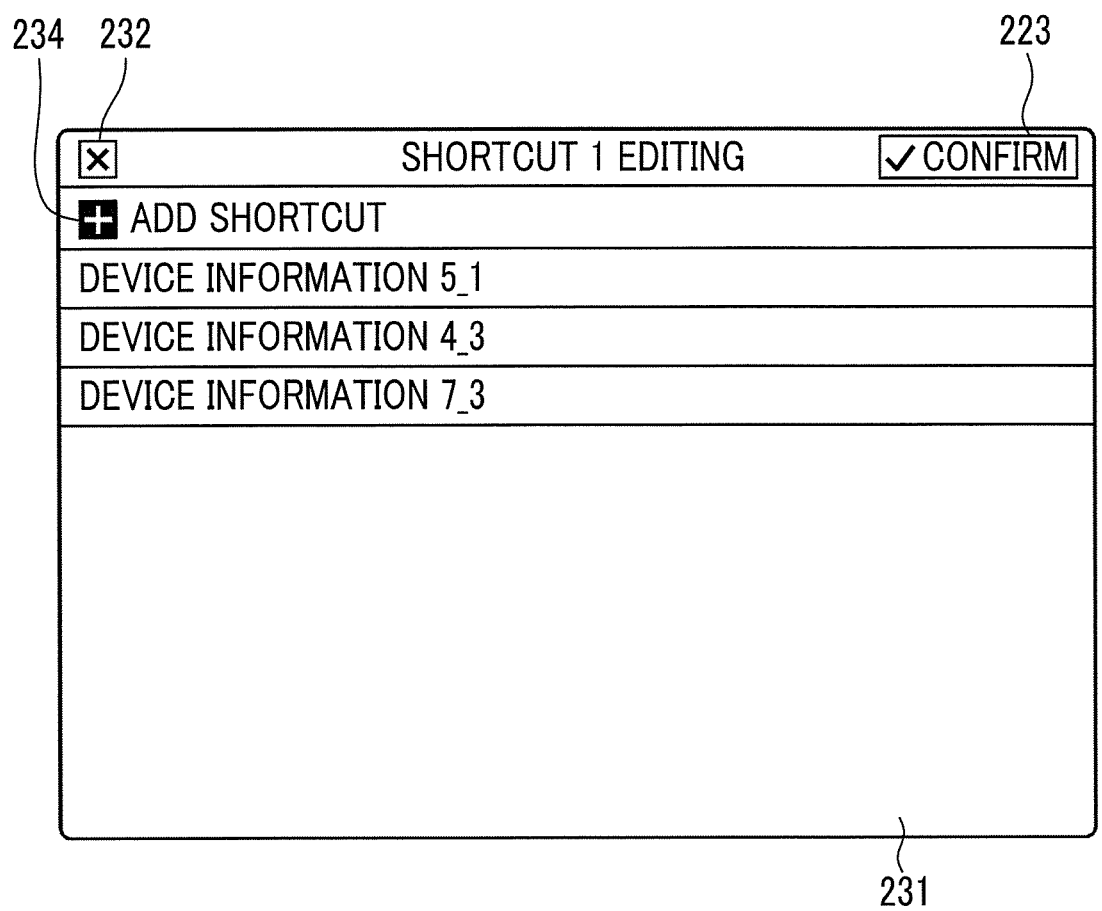
FIG. 12 is a diagram illustrating an example of an editing screen for a shortcut.

FIG. 12 is a diagram illustrating an example of an editing screen 231 fora shortcut. The editing screen 231 illustrated in FIG. 12 is a screen for editing "shortcut 1".

The editing screen registered as the shortcut 1 is configured with a setting screen corresponding to "device information 5_1", a setting screen corresponding to "device information 4_3", and a setting screen corresponding to "device information 7_3". As illustrated in FIG. 12, the editing screen 231 displays a list of a plurality of setting screens associated with "shortcut 1".

Ina case of FIG. 12, the upper setting screen is displayed before the lower setting screen.

Therefore, in the case of FIG. 12, the setting screen corresponding to "device information 5_1" is first displayed, then the setting screen corresponding to "device information 4_3" is displayed, and finally the setting screen corresponding to "device information 7_3" is displayed.

In a case where the editing screen 231 of the shortcut is displayed, the CPU 311 determines whether or not there is a user operation (step S13).

While a negative result is obtained in step S13, the CPU 311 repeats the determination in step S13. On the other hand, in a case where a positive result is obtained in step S13, the CPU 311 executes a process according to contents of the operation.

For example, in a case where an operation detected in step S13 is an operation of a button 232 (see FIG. 12) disposed in the upper left corner on the editing screen 231 (see FIG. 12), the CPU 311 immediately closes the editing screen 231.

For example, in a case where the operation detected in step S13 is an operation of a confirm button 233 (see FIG. 12) disposed in the upper right corner on the editing screen 231, the CPU 311 updates the storage device 319 with contents of the RAM 313 (see FIG. 2) and close the editing screen 231 (step S14).

For example, in a case where the operation detected in step S13 is an operation of an add button 234 (see FIG. 12) disposed on the editing screen 231, the CPU 311 receives a setting screen to be additionally registered (step S15).

The processing operation executed in step S15 is the same as the processing operation for registering the above-described shortcut. Also in a case of additional registration of a shortcut, it is possible to associate only one setting screen with the shortcut being edited, and it is possible to associate a plurality of setting screens with the shortcut being edited.

In a case where the registration of the additional setting screen is completed in step S15, the CPU 311 updates the RAM 313 with information on the additionally registered setting screen (step S16), and returns to the determination in step S13.

The additionally registered setting screen is added to a lower position than the last before the addition. In the case of FIG. 12, the additionally registered setting screen is added to a position below "device information 7_3".

Figure 13:
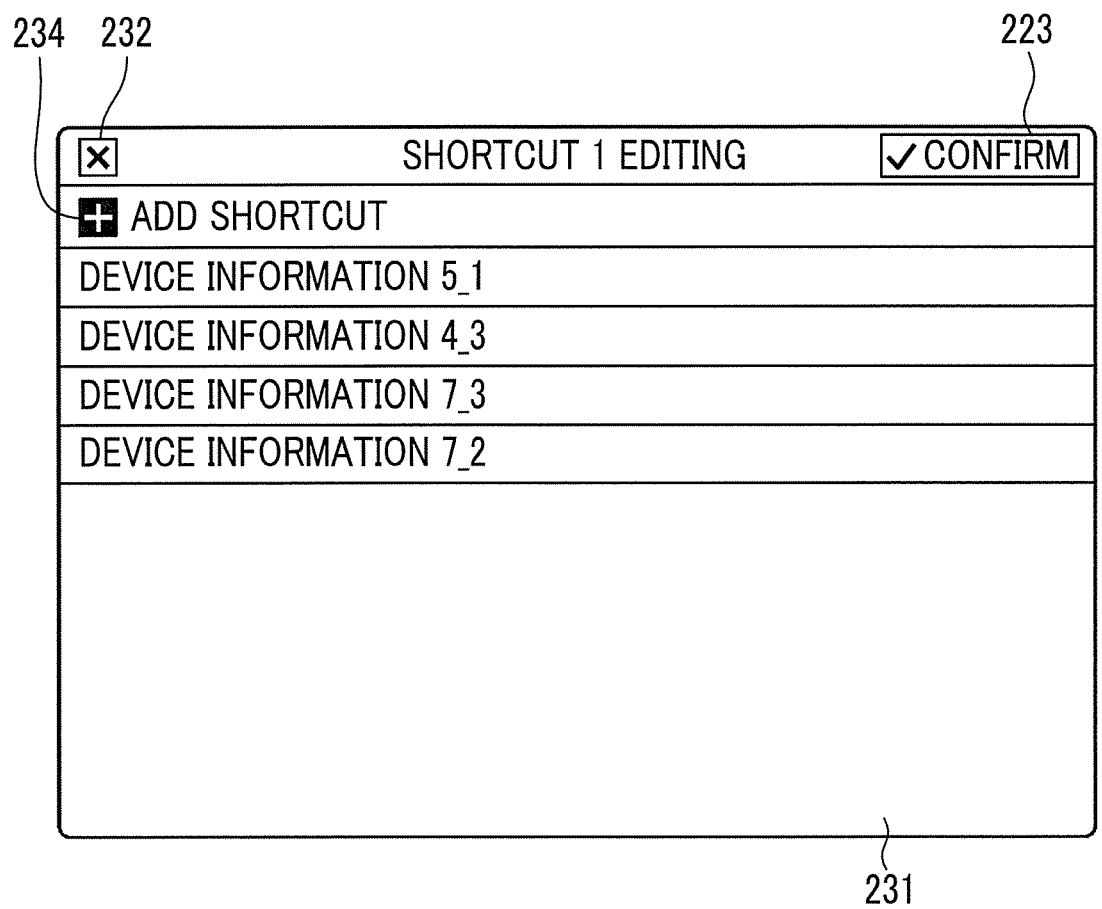
FIG. 13 is a diagram illustrating an example of a display on a touch panel after additional registration of a setting screen for "shortcut 1"

FIG. 13 is a diagram illustrating an example of a display on a touch panel after additional registration of a setting screen for "shortcut 1". In FIG. 13, the portions corresponding to those in FIG. 12 are illustrated with the corresponding reference numerals.

In a case of FIG. 13, the additionally registered setting screen is a setting screen of "device information 7_2". Therefore, "device information 7_2" is inserted below "device information 7_3".

In a case where the operation detected in step S13 is a move button of device information associated with "shortcut 1", the CPU 311 receives a rearrangement instruction (step S17). The display on the touch panel changes according to the received operation.

In a case where the rearrangement operation is received in step S17, the CPU 311 updates the RAM 313 with information after rearrangement (step S18) and returns to the determination in step S13.

Figure 14:
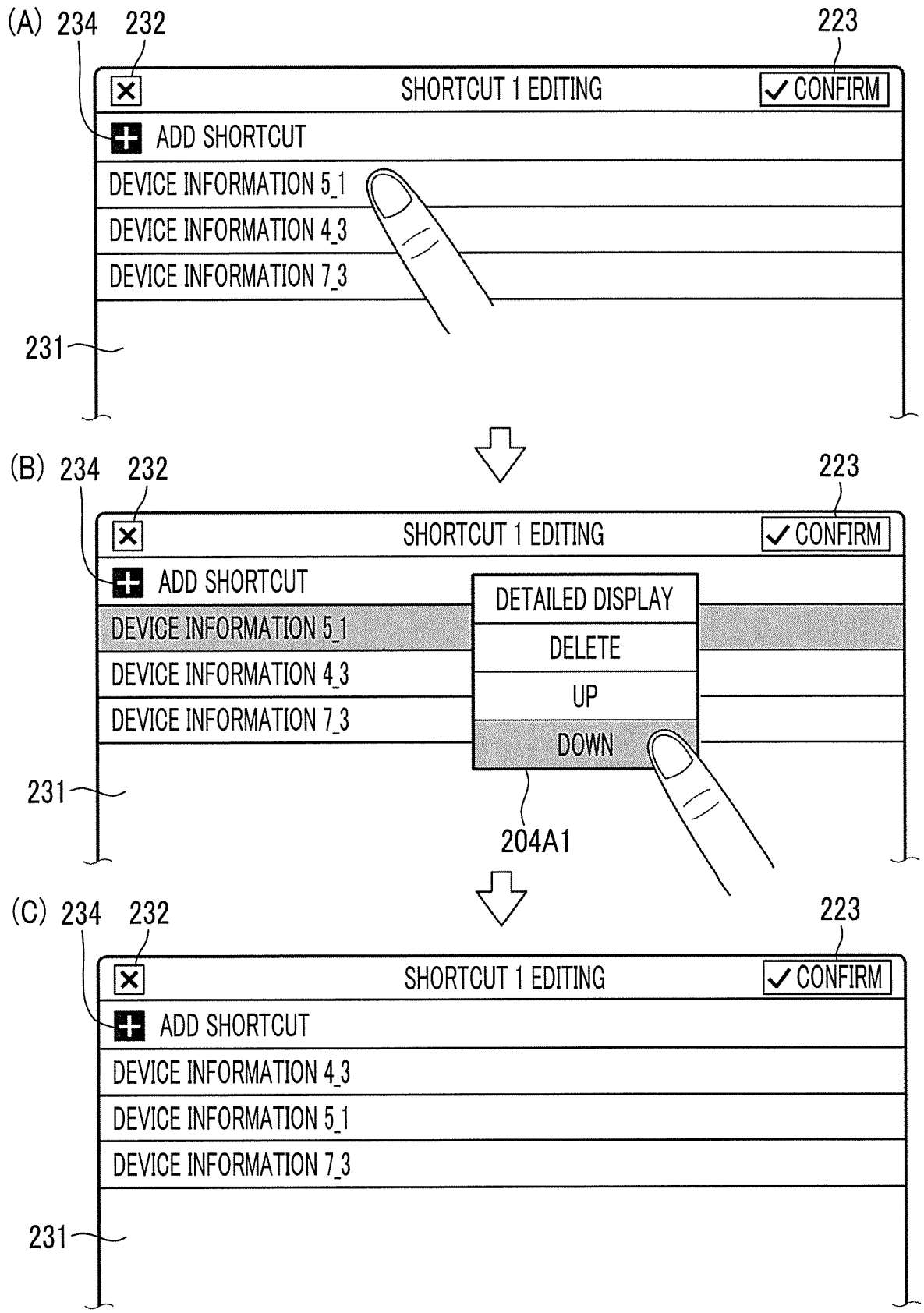
FIG. 14 is a diagram illustrating rearrangement of an output order of a setting screen associated with "shortcut 1", a part (A) in FIG. 14 is a diagram illustrating selection of a setting screen which is a target of operation, a part (B) in FIG. 14 is a diagram illustrating an instruction of moving a small screen displayed in a pop-up format, and a part (C) in FIG. 14 is a diagram illustrating a display after rearrangement.

FIG. 14 is a diagram illustrating rearrangement of an output order of a setting screen associated with "shortcut 1". A part (A) in FIG. 14 is a diagram illustrating selection of a setting screen which is a target of operation; a part (B) in FIG. 14 is a diagram illustrating an instruction of moving a small screen 204A1 displayed in a pop-up format; and a part (C) in FIG. 14 is a diagram illustrating a display after rearrangement. In FIG. 14, the portions corresponding to those in FIG. 12 are illustrated with the corresponding reference numerals. In other words, FIG. 14 illustrates replacement of the order of the setting screens output on the screen in a case where an icon is operated.

The small screen 204A1 is displayed by selecting one of the setting screens displayed on the editing screen 231. In a case of FIG. 14, a line of "device information 5_1" located at the top of the setting screen associated with "shortcut 1" is selected.

On the small screen 204A1, "detailed display", "delete", "up", and "down" are displayed as four options. The option of "detailed display" functions as a check button, the option of "delete" functions as a delete button, and the options of "up" and "down" function as move buttons.

In FIG. 14, since the option of "down" is operated, arrangement in the output order of the setting screens is changed to "device information 4_3", "device information 5_1", and "device information 7_3". In a case where the option of "up" is operated in a state in which "device information 7_3" is selected, the output order of the setting screens is changed to "device information 5_1", "device information 7_3", and "device information 4_3".

In the example in FIG. 14, the rearrangement of the lines is realized by the operation of the option instructing a moving direction, but the rearrangement may be realized by another method.

In a case where the operation detected in step S13 is the option of "delete" displayed on the small screen 204A1, the CPU 311 deletes information on the operated line from the RAM 313 (step S19), and then returns to the determination in step S13.

FIG. 15 is a diagram illustrating an example of deleting a setting screen associated with "shortcut 1". A part (A) in FIG. 15 is a diagram illustrating a mode in which a top line is deleted, and a part (B) in FIG. 15 is a diagram illustrating a display after the deletion. In FIG. 15, the portions corresponding to those in FIG. 12 are illustrated with the corresponding reference numerals.

In a case of FIG. 15, an option of "delete" on the small screen 204A1 is being operated in a state in which a line corresponding to "device information 5_1" selected.

In the example in FIG. 15, the line of "device information 5_1" to be deleted is immediately deleted from the screen.

Figure 16:
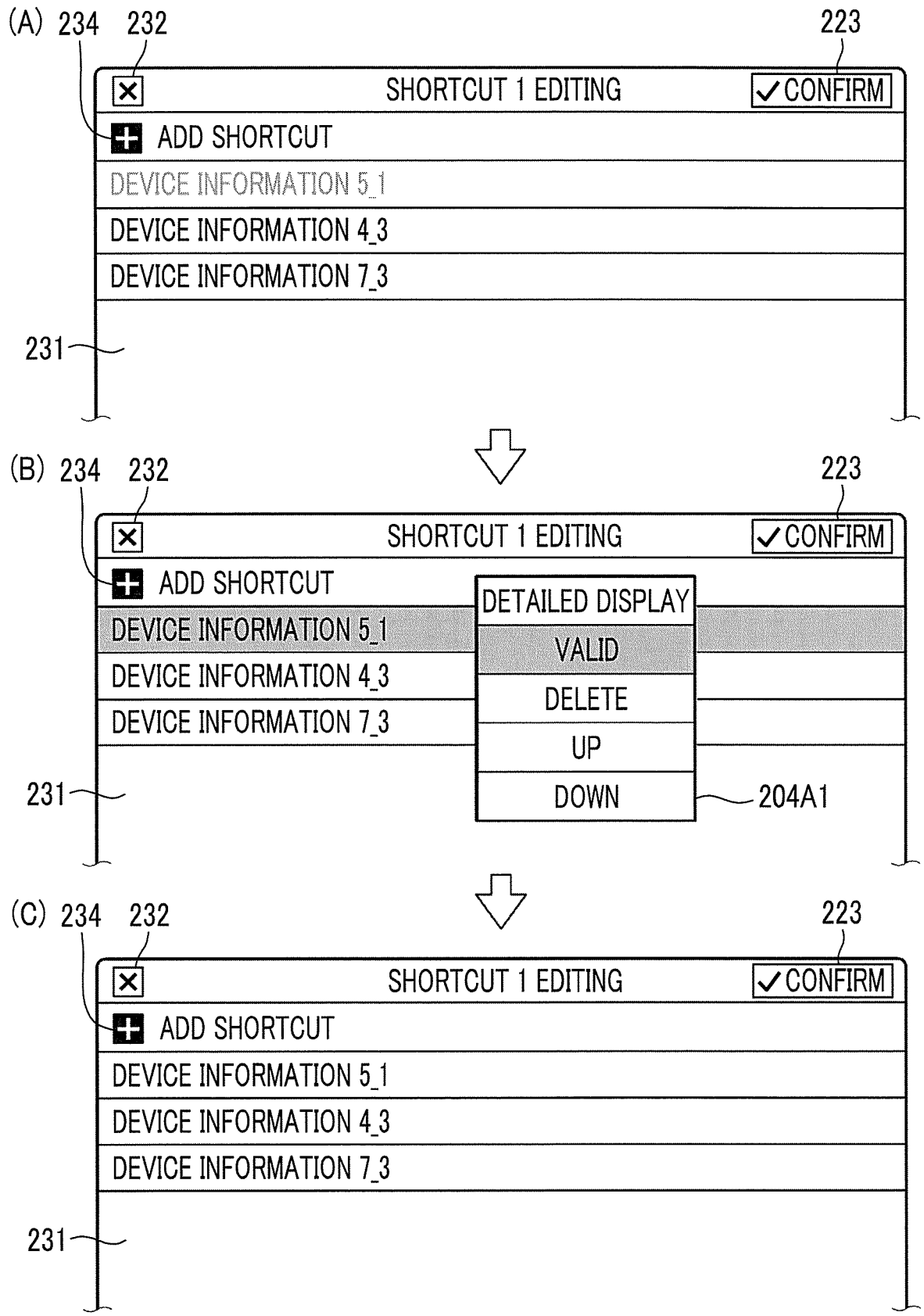
FIG. 16 illustrates an editing screen in a case where there is a setting screen in which a setting operation is not detected a predetermined number of times or more regardless of being registered as a shortcut and a change in a display of the editing screen by an instruction of a user, a part (A) in FIG. 16 is an editing screen in a case where a non-operation for "device information 5_1" is detected the predetermined number of times or more, a part (B) in FIG. 16 is a diagram illustrating an instruction for a small screen displayed in a pop-up format, and a part (C) in FIG. 16 is an editing screen in a case where the display of "device information 5_1" becomes valid again.

FIG. 16 illustrates the editing screen 231 in a case where there is a setting screen in which a setting operation is not detected a predetermined number of times or more regardless of being registered as a shortcut and a change in a display of the editing screen 231 by an instruction of the user. A part (A) in FIG. 16 is the editing screen 231 in a case where a non-operation for "device information 5_1" is detected the predetermined number of times or more, a part (B) in FIG. 16 is a diagram illustrating an instruction for a small screen displayed in a pop-up format, and a part (C) in FIG. 16 is the editing screen 231 in a case where the display of "device information 5_1" becomes valid again. In FIG. 16, the portions corresponding to those in FIG. 15 are illustrated with the corresponding reference numerals.

In the present exemplary embodiment, one call of "shortcut 1" is counted as once. The predetermined number of times may be set as an initial value or may be designated by the user. The number of non-operations may be the number of continuous calls of non-operations, or may be a total number of calls in which the non-operations are recorded.

In a case of the part (A) in FIG. 16, since the number of times of non-operation on the setting screen of "device information 5_1" exceeds the predetermined number, a line of "device information 5_1" is displayed in a grayed-out state. The user who sees this display can understand that "device information 5_1" is associated with "shortcut 1", and the setting screen is less frequently set by the user.

In the case of the part (B) in FIG. 16, "device information 5_1" in the grayed-out state is selected and an option of "valid" is operated. Therefore, in the editing screen 231 illustrated in the (C) in FIG. 16, the grayed-out display of "device information 5_1" is released. An operation of a button of "valid" is not illustrated in the flowchart illustrated in FIG. 10.

In a case where the operation detected in step S13 is an operation of a check button, the CPU 311 displays a check screen of the setting screen corresponding to the operated check button (step S20), and then returns to the determination in step S13.

FIG. 17 is a diagram illustrating a mode in which contents of a setting screen of a corresponding line are displayed on the editing screen 231 by operating a check button. A part (A) in FIG. 17 is a diagram illustrating a mode in which a check button of a line of "device information 5_1" is operated, and a part (B) in FIG. 17 is a diagram illustrating a display of the editing screen 231 after the operation. In FIG. 17, the portions corresponding to those in FIG. 12 are illustrated with the corresponding reference numerals.

As described above, the check button corresponds to the "detailed display" of the options displayed on the small screen 204A1.

By displaying the check button on the small screen 204A1, it becomes possible to check contents of the items which can be set on each setting screen from the editing screen 231.

In the case of FIG. 17, it can be seen that an item A and an item B can be set on the setting screen of "device information 5_1". The item A and the item B here are examples of items displayed in a selectable manner.

In addition to this, in the present exemplary embodiment, a function of combining a plurality of registered shortcuts is provided for editing shortcuts.

FIG. 18 is a diagram illustrating a mode of receiving a combination of registered shortcuts on the screen 221 on which a list of shortcuts is displayed. A part (A) in FIG. 18 illustrates an operation of a button 220E for instructing the combination of the shortcuts, a part (B) in FIG. 18 illustrates a state in which two shortcuts to be combined are selected, and a part (C) in FIG. 18 illustrates a display after execution of the combination.

In FIG. 18, a state in which two of "shortcut 2" and "shortcut 3" are designated as targets of combination is represented by changing a display form of the corresponding lines. A relationship between "shortcut 2" and "shortcut 3" here corresponds to one icon and another icon. In a case where an execute button 220F is operated after designating the combination target, a combination process of a plurality of shortcuts is executed.

In the case of the present exemplary embodiment, in a case where the execute button 220F is operated, arrangement of setting screens corresponding to each shortcut is determined in the order in which the shortcuts are designated. Meanwhile, a screen for checking the arrangement order of the setting screens after the combination may be displayed.

Further, a screen for inputting a name of the shortcut after the combination may be displayed.

In FIG. 18, the name after the combination is changed to "shortcut 2+3".

Shortcut Calling

Hereinafter, a processing operation related to shortcut calling will be described with reference to FIGS. 19 to 24.

Figure 19:
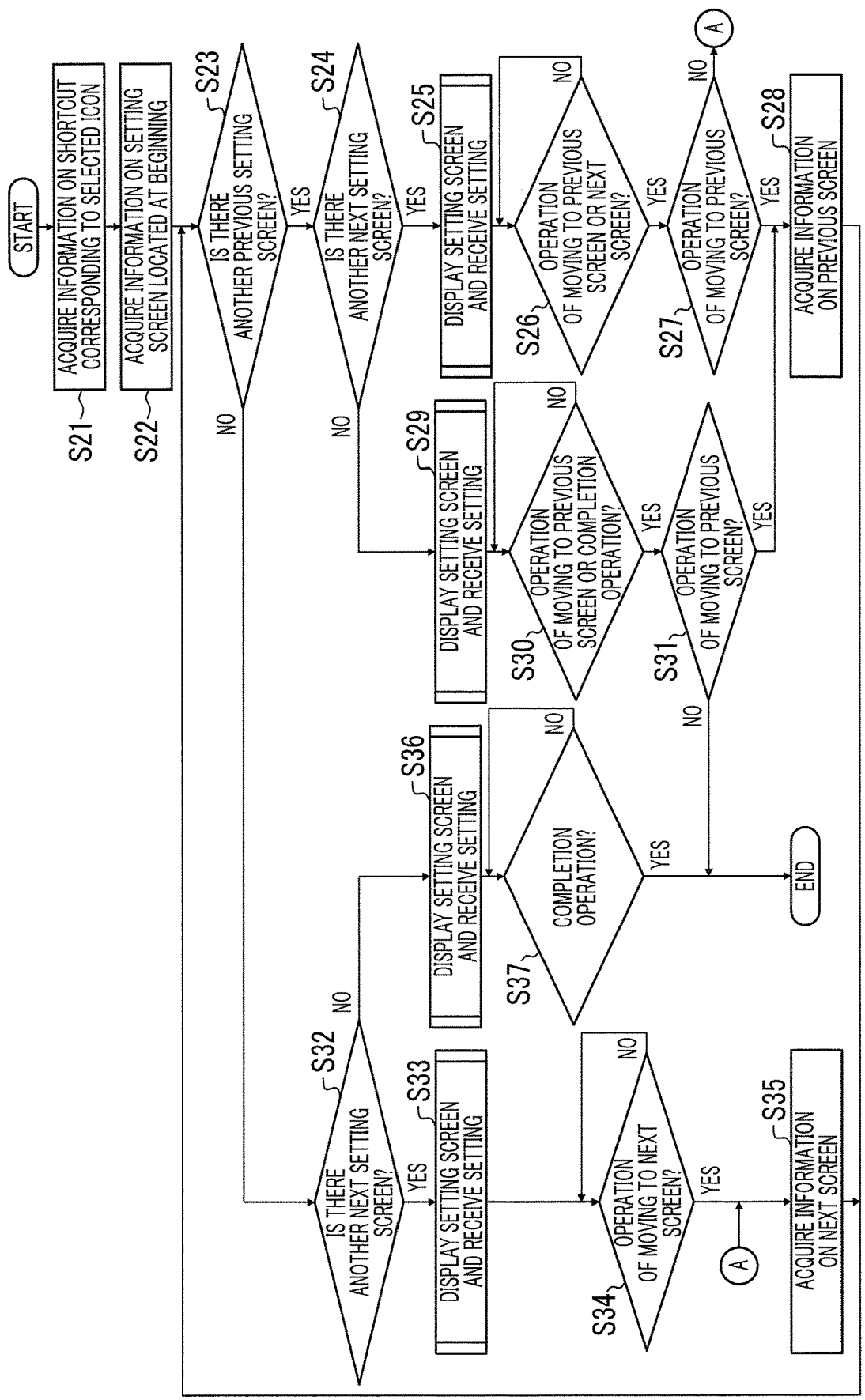
FIG. 19 is a flowchart illustrating an example of a processing operation executed in a case where a shortcut is called.

FIG. 19 is a flowchart illustrating an example of a processing operation executed in a case where a shortcut is called. The symbol S illustrated in FIG. 19 means a step.

This flowchart is started in a case where the CPU 311 (see FIG. 2) receives selection of an icon for a specific shortcut on a home screen.

Figure 20:
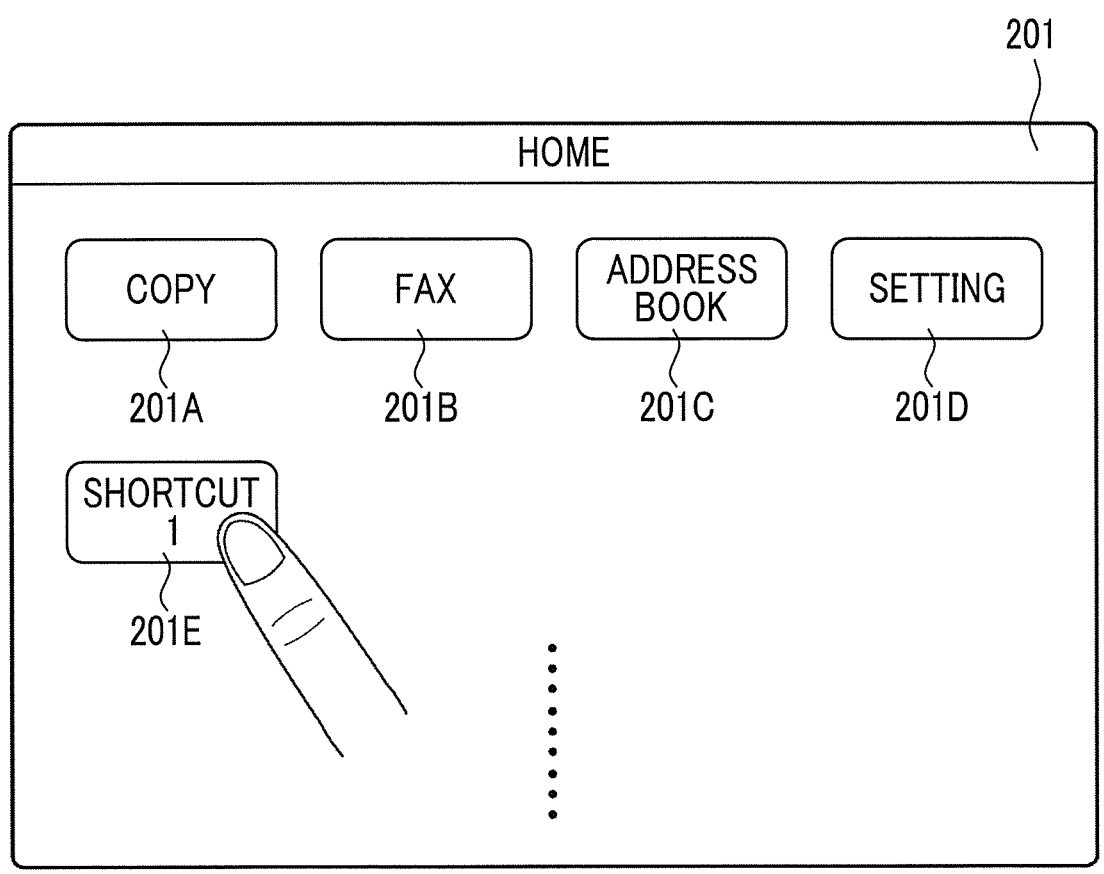
FIG. 20 is a diagram illustrating a state in which an icon labeled with "shortcut 1" is selected on a home screen.

FIG. 20 is a diagram illustrating a state in which the icon 201E labeled with "shortcut 1" is selected on the home screen 201. In FIG. 20, the portions corresponding to those in FIG. 9 are illustrated with the corresponding reference numerals.

First, the CPU 311 acquires information on a shortcut corresponding to the selected icon (step S21). The information here is acquired from the storage device 319 (see FIG. 2). The CPU 311 stores the acquired information in the RAM 313 (see FIG. 2).

Next, the CPU 311 acquires information on a setting screen located at a beginning of an arrangement order in the acquired shortcut information (step S22).

Next, the CPU 311 determines whether or not there is another setting screen before the setting screen to be processed (step S23).

In a case where the setting screen to be processed is a top screen, the CPU 311 obtains a negative result in step S23. On the other hand, in a case where the arrangement order of the setting screens to be processed is the second or below, the CPU 311 obtains a positive result in step S23.

Here, it is assumed that the positive result is obtained in step S23. In this case, the CPU 311 determines whether or not there is another setting screen next to the setting screen to be processed (step S24).

A case where a positive result is obtained in step S24 is a case where the setting screen to be processed is located between the beginning and the end in the arrangement order.

In this case, the CPU 311 displays the setting screen to be processed and receives a setting (step S25).

Next, the CPU 311 determines whether or not the setting is an operation of moving to the previous screen or the next screen (step S26). Here, the movement is realized by operating a move button displayed on the setting screen called up through the shortcut.

While the negative result is obtained in step S26, the CPU 311 repeats the determination in step S26.

In a case where an operation of any one of move buttons is detected, the CPU 311 determines whether or not the operation is an operation of moving to the previous screen (step S27).

In a case where a positive result is obtained in step S27, the CPU 311 acquires information on the previous screen (step S28) and returns to the determination in step S23.

In a case where a negative result is obtained in step S27, the CPU 311 acquires information on the next screen (step S35) and returns to the determination in step S23.

On the other hand, a case where a negative result is obtained in step S24 will be described. In this case, a setting screen to be processed is located at the end of the arrangement order.

In this case, the CPU 311 displays the setting screen to be processed and receives a setting (step S29).

Next, the CPU 311 determines whether the operation is a movement operation to the previous screen or a completion operation (step S30). Here, the movement is realized by an operation on the move button or an operation on the completion button displayed on the setting screen called through the shortcut.

While a negative result is obtained in step S30, the CPU 311 repeats the determination in step S30.

In a case where an operation of any one of buttons is detected, the CPU 311 determines whether or not the operation is a movement operation to the previous screen (step S31).

In a case where a positive result is obtained in step S31, the CPU 311 acquires information on the previous screen (step S28) and returns to the determination in step S23.

In a case where a negative result is obtained in step S31, the CPU 311 completes the setting by calling the shortcut.

Next, a case where the negative result is obtained in step S23 will be described. In this case, a setting screen to be processed is the beginning in the arrangement order.

Next, the CPU 311 determines whether or not there is another next setting screen (step S32).

A case where a positive result is obtained in step S32 is a case where there are a plurality of setting screens associated with the shortcut.

In this case, the CPU 311 displays the setting screen to be processed and receives a setting (step S33). Next, the CPU 311 determines whether or not the setting is an operation of moving to the next screen (step S34).

In a case where a negative result is obtained in step S34, the CPU 311 repeats the determination in step S34.

In a case where a positive result is obtained in step S34, the CPU 311 acquires information on the next screen (step S35) and returns to the determination in step S23.

Next, a case where a negative result is obtained in step S32 will be described. In this case, there is only one setting screen associated with the shortcut.

In this case, the CPU 311 displays the setting screen to be processed and receives a setting (step S36).

Next, the CPU 311 determines whether or not the setting is a completion operation (step S37).

In a case where a negative result is obtained in step S37, the CPU 311 repeats the determination in step S37.

In a case where a positive result is obtained in step S37, the CPU 311 completes the setting by calling the shortcut.

Figure 21:
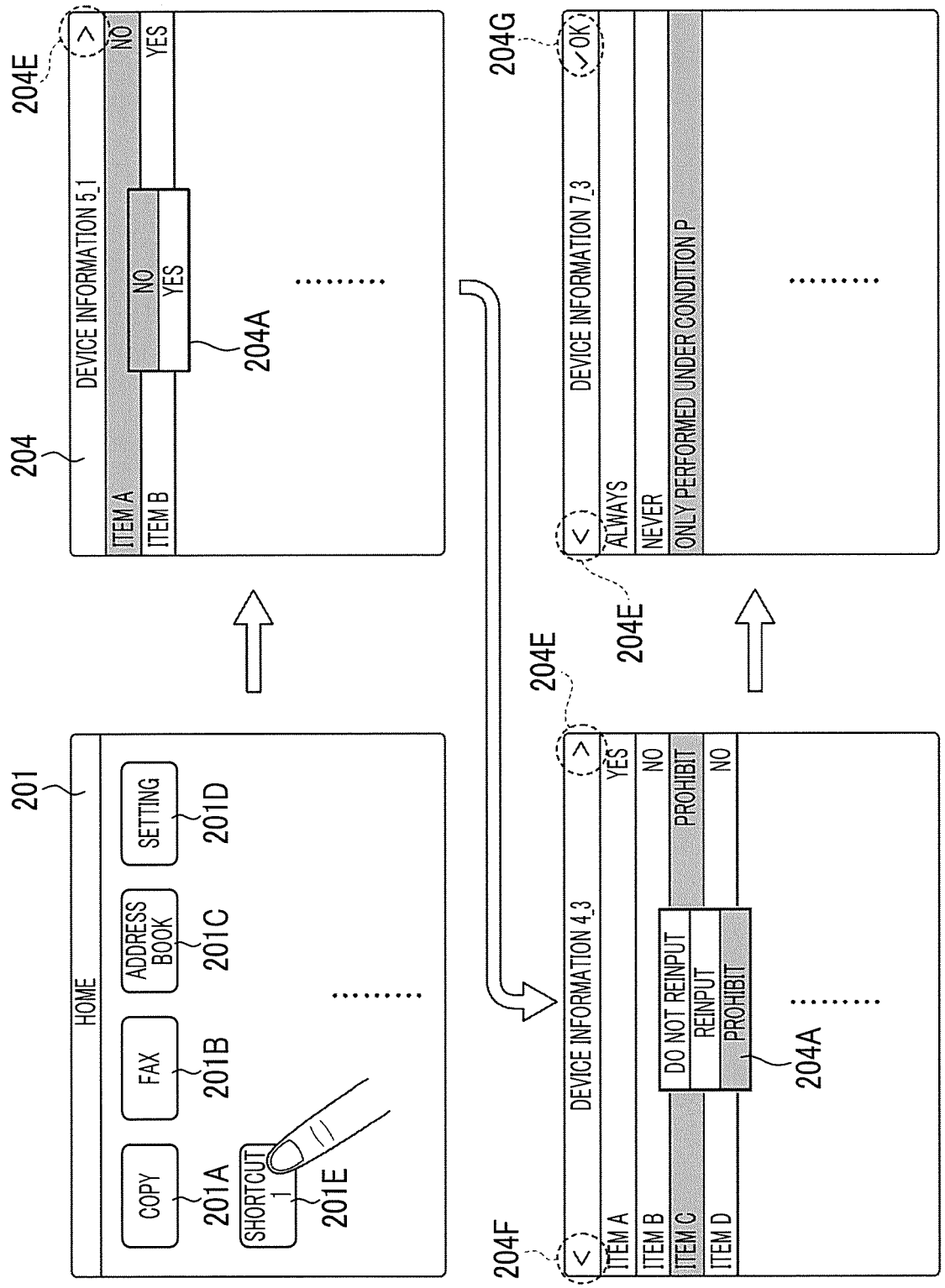
FIG. 21 is a diagram illustrating a transition of a display of a setting screen in a case where an icon for calling a shortcut is selected on a home screen.

FIG. 21 is a diagram illustrating a transition of a display of a setting screen in a case where an icon for calling a shortcut is selected on the home screen 201.

The shortcut is called by operating a move button 204E. In the case of the present exemplary embodiment, the setting screens are read from the beginning in the stored arrangement order. Each setting screen readout in the order of arrangement corresponds to "each screen" of the plurality of screens associated with the shortcut.

First, the screen 204 of "device information 5_1" is displayed. On the screen 204, a state of an item set last at the time of the previous call is distinguishably displayed.

As illustrated in FIG. 21, on the screen 204 of "device information 5_1", the small screen 204A is also displayed in an open state from the beginning. That is, a snapshot of a screen at the time of the previous setting is displayed. For example, a setting of an item A is displayed in a state in which "no" is selected. Therefore, it becomes possible to start a setting operation from a state in which there is a high possibility that a setting is changed. Of course, in a case of setting other items on the same screen, the corresponding line may be tapped.

Since the screen 204 of "device information 5_1" is located at the beginning of the arrangement order, the move button 204E for receiving movement to the next screen is displayed in the upper right corner on the screen 204.

In a case where the user operates the move button 204E, the display is switched to the screen 204 of "device information 4_3" having the second arrangement order.

Also in a case of the screen 204 of "device information 4_3", the small screen 204A is displayed in an open state from the beginning.

There are other setting screens 204 associated with the same shortcut before and after the screen 204 of "device information 4_3". Therefore, a move button 204F for receiving movement to the previous screen is additionally displayed in the upper left corner on the screen 204. By operating the move button 204F, it is possible to move to the previous setting screen 204.

In a case where the user operates the move button 204E, the display is switched to the screen 204 of "device information 7_3" having the third arrangement order.

In a case of the screen 204 of "device information 7_3", the small screen 204A is not displayed since there is one item to be set. In FIG. 21, a content set at the time of the previous call is displayed in a state of being distinguished from other contents.

The other setting screen 204 exists before the screen 204 of "device information 7_3", but the other setting screen 204 does not exist after the screen 204 of "device information 7_3". Therefore, a completion button 204G is displayed in the upper right corner on the screen 204. In a case where the completion button 204G is operated, the current setting is confirmed and the setting data 319A of the storage device 319 (see FIG. 2) is updated.

Figure 22:
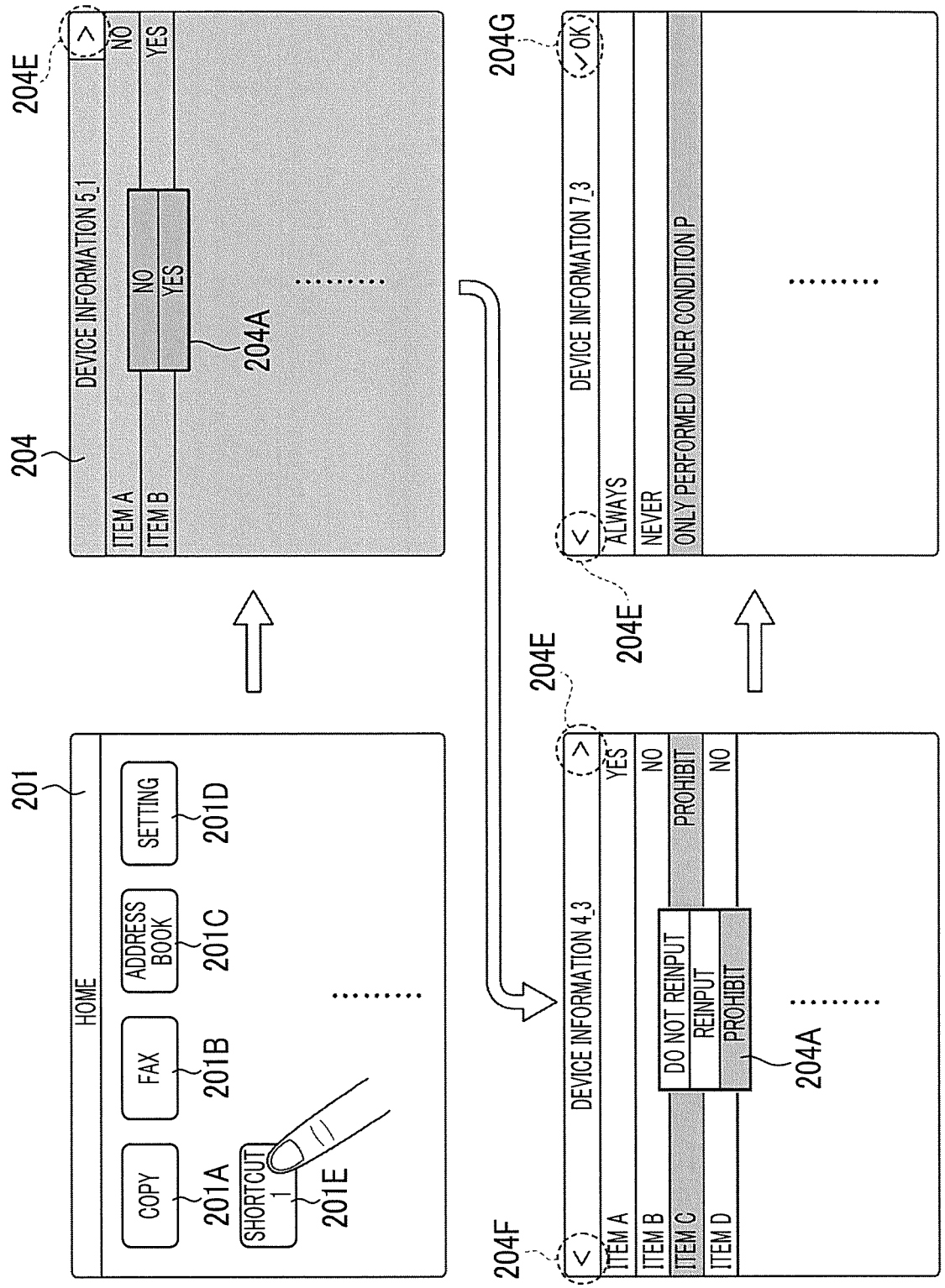
FIG. 22 is a diagram illustrating a transition of a display in a case where a setting screen with a large number of times of non-operation is associated with a shortcut.

FIG. 22 is a diagram illustrating a transition of a display in a case where a setting screen with a large number of times of non-operation is associated with a shortcut. In FIG. 22, the portions corresponding to those in FIG. 21 are illustrated with the corresponding reference numerals.

The example in FIG. 22 is a case where the number of times of non-operation on the setting screen of "device information 5_1" is greater than a predetermined number. Therefore, the setting screen of "device information 5_1" is grayed out and displayed. Meanwhile, an operation of the move button 204E used to move to the next screen is valid. Therefore, only an area of the move button 204E is excluded from the grayed-out display target. Of course, in a case where a position of the deleted setting screen is the second position or the third position in the arrangement order, the move button 204F used to move to the previous screen is displayed in an operable state. The same applies to the completion button 204G.

In a case where the user long-presses a predetermined area or the like of the grayed-out setting screen 204, the grayed-out display may be canceled and the setting screen may be operated. In a case where this function is provided, it is possible to save the effort of opening the editing screen and operating the option of "valid".

Figure 23:
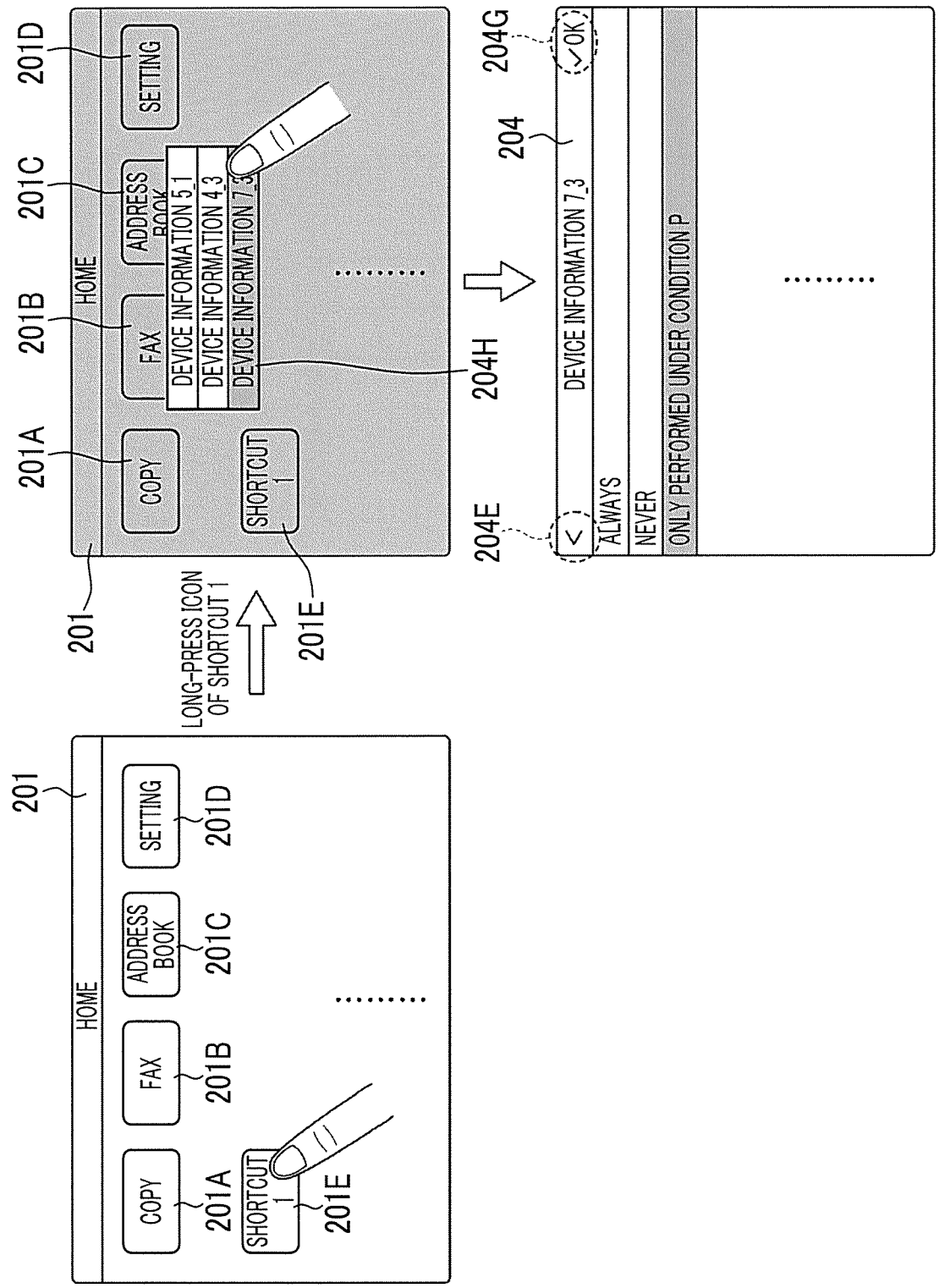
FIG. 23 is a diagram illustrating a function of jumping to a specific setting screen when a shortcut is called.

FIG. 23 is a diagram illustrating a function of jumping to a specific setting screen when a shortcut is called. In FIG. 23, the portions corresponding to those in FIG. 21 are illustrated with the corresponding reference numerals.

The shortcut is called by tapping the icon 201E, but in the present exemplary embodiment, in a case where the icon 201E is long-pressed, a screen for selecting a setting screen associated with the shortcut is displayed. In a case of FIG. 23, the home screen 201 is changed to a grayed-out display, and a small screen 204H for displaying a list of setting screens associated with "shortcut 1" is popped up on the front side of the home screen 201.

In the case of FIG. 23, the user selects a line of the setting screen of "device information 7_3". As a result, the screen 204 corresponding to the selected line is displayed on the touch panel regardless of the arrangement order. By adopting this function, it becomes possible to selectively call the specific setting screen 204 of which setting needs to be changed.

Other Exemplary Embodiments

Although the exemplary embodiments of the present invention are described above, a technical scope of the exemplary embodiments of the present invention is not limited to the scope described in the exemplary embodiments described above. Various modifications or improvements are added to the exemplary embodiments described above within the technical scope of the exemplary embodiments of the present invention, and are apparent from the description of the claims.

For example, in the above-described exemplary embodiment, a case where a call of the setting screen of the device constituting the image forming apparatus 1 (see FIG. 1) having a so-called scanner or fax transmission and reception function is associated with one icon is described, and the information processing apparatus having the function of associating the call of the setting screen with one icon is not limited to the image forming apparatus 1. The apparatus can be applied to any apparatus as long as the apparatus has a function of calling a setting screen of the device through a user interface. For example, a smartphone or a computer may be used.

For example, in the above-described exemplary embodiment, the line of the device information with a deletion instruction on the editing screen 231 is immediately deleted, but the editing screen may be displayed until the number of times the shortcut is called reaches a predetermined number after the deletion to check the line on the editing screen 231.

Figure 24:
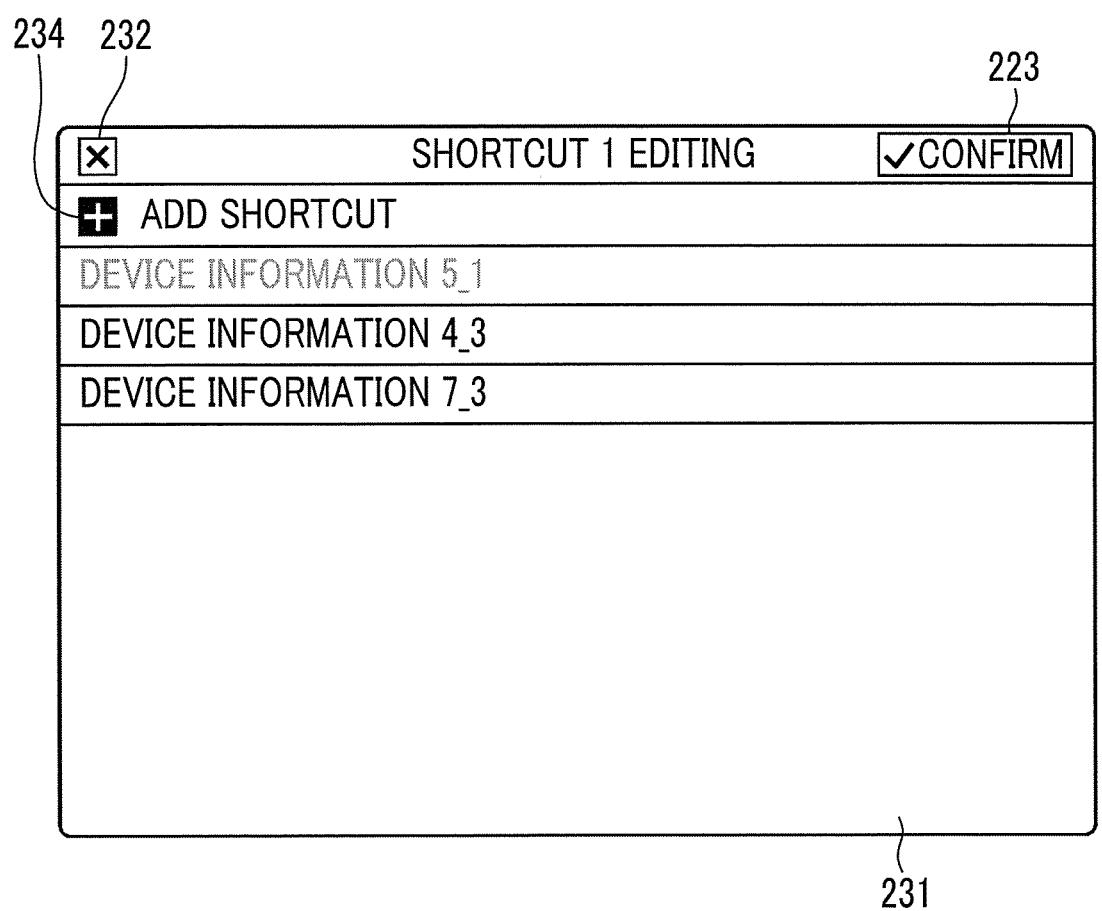
FIG. 24 is a diagram illustrating an example of displaying a line of device information for which a deletion instruction is given in a grayed-out state on an editing screen.

FIG. 24 is a diagram illustrating an example of displaying a line of device information for which a deletion instruction is given in a grayed-out state on the editing screen 231. Even after the deletion, the deleted information on the setting screen is displayed in a mode different from the others, so that it is easy to check that the current state is deleted.

Further, since the deleted information is grayed out, even in a case where the user wants to re-validate the association with the shortcut, it is not necessary to find and add the corresponding screen again.

The presentation of the existence of the deleted setting screen by the grayed-out display may be stopped after the number of times the corresponding shortcut is called reaches a predetermined number. That is, in the same manner as the editing screen 231 illustrated in FIG. 15, the existence of the deleted setting screen may not be illustrated on the screen.

In the exemplary embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to
store a plurality of screens satisfying a predetermined condition among screens used for setting a device accompanying a series of screen transitions, in association with one icon; and
display the plurality of screens associated with the icon in order and receive the setting of the device from each screen of the plurality of screens in a case where a user selects the icon,
wherein the predetermined condition is designation by the user performed in a process of transitioning the screen.

2. The information processing apparatus according to claim 1,
wherein the designation is performed by operating a specific button displayed on the screen used for setting.

3. The information processing apparatus according to claim 1,
wherein the designation is performed by selecting an item selectably displayed on the screen used for setting.

4. The information processing apparatus according to claim 1,
wherein the processor is configured to, in a case where the user operates an area different from both a specific button displayed on the screen and an item selectably displayed on the screen in a state in which the screen used for setting the device is displayed, exclude the screen from the screens associated with the icon.

5. The information processing apparatus according to claim 1,
wherein the processor is configured to receive an edit on the screen associated with the icon, on an editing screen on which a list of the plurality of screens associated with the icon is displayed.

6. The information processing apparatus according to claim 5,
wherein the processor is configured to receive a change in a display order of screens displayed when the icon is operated, on the editing screen.

7. The information processing apparatus according to claim 5,
wherein the processor is configured to receive deletion of the screen associated with the icon, on the editing screen.

8. The information processing apparatus according to claim 7,
wherein the processor is configured to display information on the deleted screen in a mode of being recognized as deleted even after the screen is designated as a deletion target, on the editing screen.

9. The information processing apparatus according to claim 8,
wherein the processor is configured to, in a case where the deleted screen is selected, return a display related to the screen to a state before the deletion, on the editing screen.

10. The information processing apparatus according to claim 8,
wherein the processor is configured to delete a display related to the screen from the editing screen in a case where a state in which the deleted screen is not selected satisfies a predetermined condition, on the editing screen.

11. The information processing apparatus according to claim 5,
wherein the processor is configured to receive an addition of a new screen associated with the icon, on the editing screen.

12. The information processing apparatus according to claim 1,
wherein the processor is configured to receive an edit on the screen associated with the icon, on the screens displayed in order in a case where the user selects the icon.

13. The information processing apparatus according to claim 1,
wherein the processor is configured to, in a case where the plurality of screens associated with the icon are displayed in order, distinguishably display set contents related to an item included in the screen.

14. The information processing apparatus according to claim 1,
wherein the processor is configured to display a screen for combining one of the icons with another of the icons.

15. A non-transitory computer readable medium storing a program causing a computer to realize:
a function of storing a plurality of screens satisfying a predetermined condition among screens used for setting a device accompanying a series of screen transitions, in association with one icon; and
a function of displaying the plurality of screens associated with the icon in order and receiving the setting of the device from each screen of the plurality of screens in a case where a user selects the icon,
wherein the predetermined condition is designation by the user performed in a process of transitioning the screen.

* * * * *